(12) United States Patent
Ikuma

(10) Patent No.: US 11,632,478 B2
(45) Date of Patent: Apr. 18, 2023

(54) MULTIFUNCTION DEVICE, DISPLAY CONTROL METHOD OF MULTIFUNCTION DEVICE, AND NON-TRANSITORY COMPUTER-READABLE STORAGE MEDIUM STORING DISPLAY CONTROL PROGRAM

(71) Applicant: SEIKO EPSON CORPORATION, Tokyo (JP)

(72) Inventor: Ken Ikuma, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/664,883

(22) Filed: May 25, 2022

(65) Prior Publication Data
US 2022/0385776 A1    Dec. 1, 2022

(30) Foreign Application Priority Data

May 27, 2021 (JP) .............................. JP2021-089071

(51) Int. Cl.
*H04N 1/00* (2006.01)
*G06F 3/04817* (2022.01)

(52) U.S. Cl.
CPC ..... *H04N 1/00469* (2013.01); *H04N 1/00397* (2013.01); *H04N 1/00413* (2013.01); *G06F 3/04817* (2013.01)

(58) Field of Classification Search
None
See application file for complete search history.

(56) References Cited

U.S. PATENT DOCUMENTS

| 2011/0141009 A1* | 6/2011 | Izumi | A63F 13/428 348/42 |
| 2019/0243527 A1* | 8/2019 | Kuribayashi | G06F 3/04817 |

FOREIGN PATENT DOCUMENTS

| JP | 2016-157156 A | 9/2016 |
| JP | 2020-151957 A | 9/2020 |

* cited by examiner

*Primary Examiner* — Lennin R Rodriguezgonzalez
(74) *Attorney, Agent, or Firm* — Global IP Counselors, LLP

(57) ABSTRACT

When an operation panel accepts a movement instruction to move a designated first icon among a plurality of icons from a first position to a second position on an edit screen, the first icon is moved to the second position, and a size of the first icon is changed with movement based on an inter-icon distance between the first icon after the movement and a second icon adjacent to the first icon after the movement.

9 Claims, 20 Drawing Sheets

MULTIFUNCTION DEVICE, DISPLAY CONTROL METHOD OF MULTIFUNCTION DEVICE, AND NON-TRANSITORY COMPUTER-READABLE STORAGE MEDIUM STORING DISPLAY CONTROL PROGRAM

The present application is based on, and claims priority from JP Application Serial Number 2021-089071, filed May 27, 2021, the disclosure of which is hereby incorporated by reference herein in its entirety.

BACKGROUND

1. Technical Field

The present disclosure relates to a multifunction device, a display control method of the multifunction device, and a non-transitory computer-readable storage medium storing a display control program.

2. Related Art

In the related art, a multifunction device having a plurality of functions such as a scanning function, a printing function, and a copying function has been known. The multifunction device is provided with an operation panel for instructing various settings and execution of various functions. JP-A-2020-151957 discloses a multifunction device including an operation panel for displaying various operation buttons. The size of various operation buttons differs depending on the type of operation button. JP-A-2016-157156 discloses a configuration in which the arrangement of icons corresponding to operation buttons is changed by a user operation.

In the operation panel that displays icons of various sizes, when a user changes the arrangement of the icons, the visibility of the operation buttons may be reduced depending on the arrangement relationship between the icon whose arrangement has been changed and other icons located around the icon whose arrangement has been changed.

SUMMARY

According to an aspect of the present disclosure, there is provided a multifunction device including: a reading unit that reads a document; a printing unit that performs printing on a medium; an operation panel that accepts an execution instruction and an edit instruction from a user and displays an operation screen including a plurality of icons and an edit screen including the plurality of icons; and a display control section that switches display of the operation panel between the operation screen and the edit screen, in which the operation panel accepts the execution instruction to execute the reading unit or the printing unit when the operation screen is displayed, and accepts the edit instruction including a movement instruction which is an instruction to move the icon when the edit screen is displayed, and the display control section moves a designated first icon among the plurality of icons to a second position when the operation panel accepts the movement instruction to move the first icon from a first position to the second position on the edit screen, and changes a length of the first icon in a predetermined direction based on an inter-icon distance between the moved first icon and a second icon adjacent to the first icon in the predetermined direction.

According to another aspect of the present disclosure, there is provided a display control method of a multifunction device including an operation panel that accepts an execution instruction and an edit instruction from a user and displays an operation screen including a plurality of icons and an edit screen including the plurality of icons, a reading unit that reads a document, and a printing unit that performs printing on a medium, the display control method including: displaying the operation screen for accepting the execution instruction to execute the reading unit or the printing unit; switching display of the operation panel from the operation screen to the edit screen for accepting the edit instruction including a movement instruction which is an instruction to move the icon; moving a designated first icon among the plurality of icons to a second position when the movement instruction to move the first icon from a first position to the second position is accepted on the edit screen; and changing a length of the first icon in a predetermined direction based on an inter-icon distance between the moved first icon and a second icon adjacent to the first icon in the predetermined direction.

According to another aspect of the present disclosure, there is provided a non-transitory computer-readable storage medium storing a display control program executed by a processor of a multifunction device including an operation panel that accepts an execution instruction and an edit instruction from a user and displays an operation screen including a plurality of icons and an edit screen including the plurality of icons, a reading unit that reads a document, and a printing unit that performs printing on a medium, the display control program causing the processor to execute: displaying the operation screen for accepting the execution instruction to execute the reading unit or the printing unit; switching display of the operation panel from the operation screen to the edit screen for accepting the edit instruction including a movement instruction which is an instruction to move the icon; moving a designated first icon among the plurality of icons to a second position when the movement instruction to move the first icon from a first position to the second position is accepted on the edit screen; and changing a length of the first icon in a predetermined direction based on an inter-icon distance between the moved first icon and a second icon adjacent to the first icon in the predetermined direction.

DESCRIPTION OF EXEMPLARY EMBODIMENTS

Figure 1:
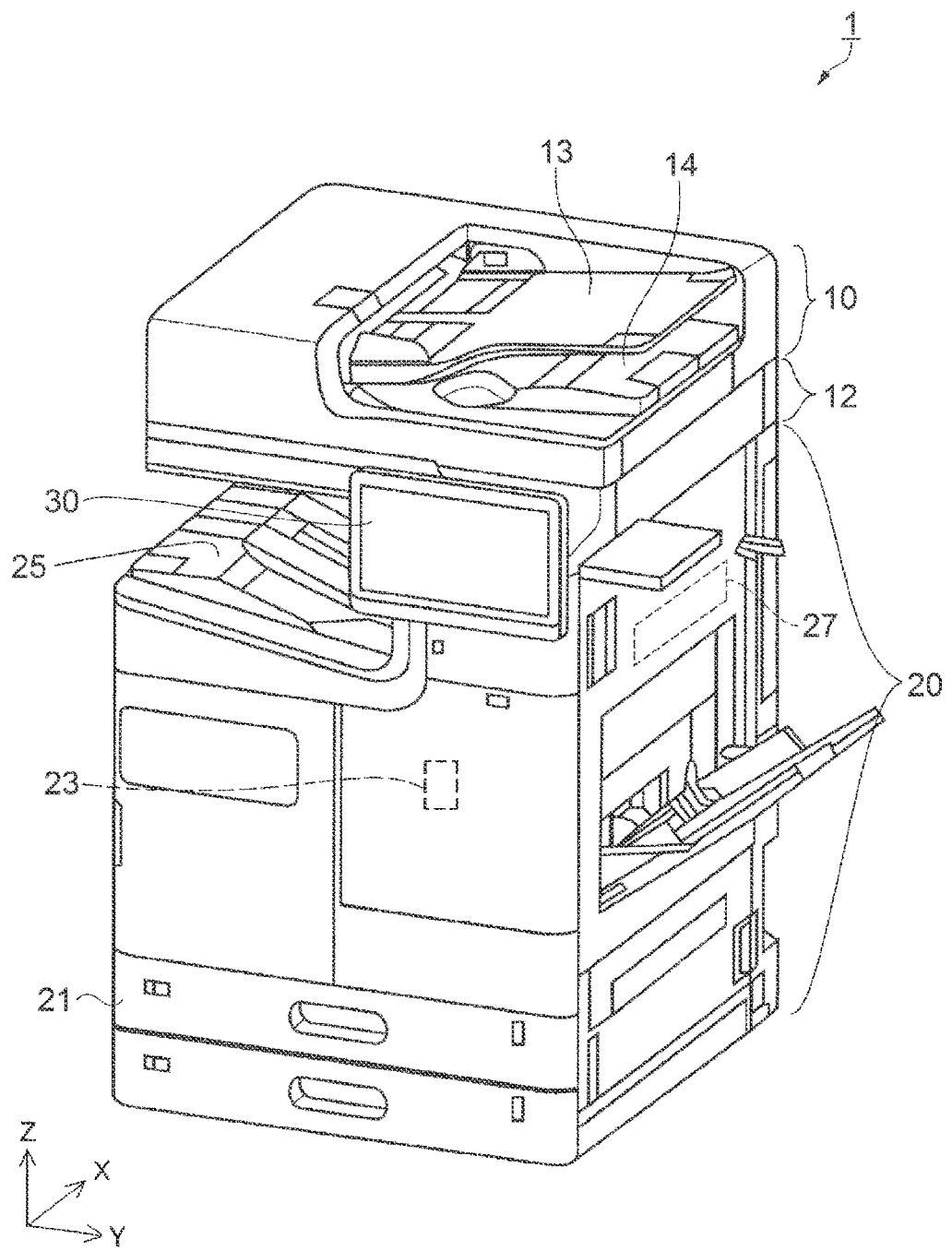
FIG. 1 is a diagram showing an outline of a multifunction device.

FIG. 1 is a perspective view showing an outline of a multifunction device 1. The multifunction device 1 includes a reading unit 10 for reading a document, a printing unit 20 for printing, and an operation panel 30.

The multifunction device 1 has a printing function of printing on a medium and a copying function of reading a document and printing the read data on the medium. The multifunction device 1 may have a scanning function of reading a document, generating and saving read data, a fax function of performing fax transmission of read data or data received from the outside. The fax function has a function of receiving fax data from the outside. The multifunction device 1 may have a call function of making a call and a mail function of transmitting a mail.

The reading unit 10 is mounted on a reading unit mounting table 12. The reading unit 10 includes a placement tray 13 on which documents are placed, and a document discharge tray 14 on which documents transported along a transport path are discharged. The reading unit 10 transports the documents placed on the placement tray 13 to the document discharge tray 14 along the transport path. A reading sensor (not shown) is provided in the transport path of the reading unit 10. The reading sensor reads an image formed on the document. The reading unit 10 corresponds to a reading section.

The printing unit 20 includes a paper cassette 21 on which a medium is placed, a printing mechanism 23, and a printed matter discharge tray 25 for discharging the medium printed by the printing mechanism 23. The printing mechanism 23 of the present embodiment is an ink jet recording head that ejects ink to a medium for recording, but a mechanism other than the ink jet recording head may be used.

The printing unit 20 may optionally include a post-processing mechanism (not shown). The post-processing mechanism performs various processing on printed matter printed by the printing unit 20. The processes executed by the post-processing mechanism include a staple process of binding a plurality of printed matters with needles or the like, a punch process of making holes in the printed matter, a folding process of folding the printed matter in half, a shift process of shifting and discharging a plurality of printed matters for each copy, and the like. The post-processing mechanism performs one or more of these processes.

The operation panel 30 displays various icons 110. The icon 110 is an image displayed on the operation panel 30. The icon 110 is an image that accepts an execution instruction to be described later. The plurality of icons 110 displayed on the operation panel 30 are separated from each other. Details of the icon 110 will be described later. The operation panel 30 is a touch panel that accepts touch operations of the user. The operation panel 30 displays an operation screen 100 and an edit screen 105 in a switchable manner.

Figure 2:
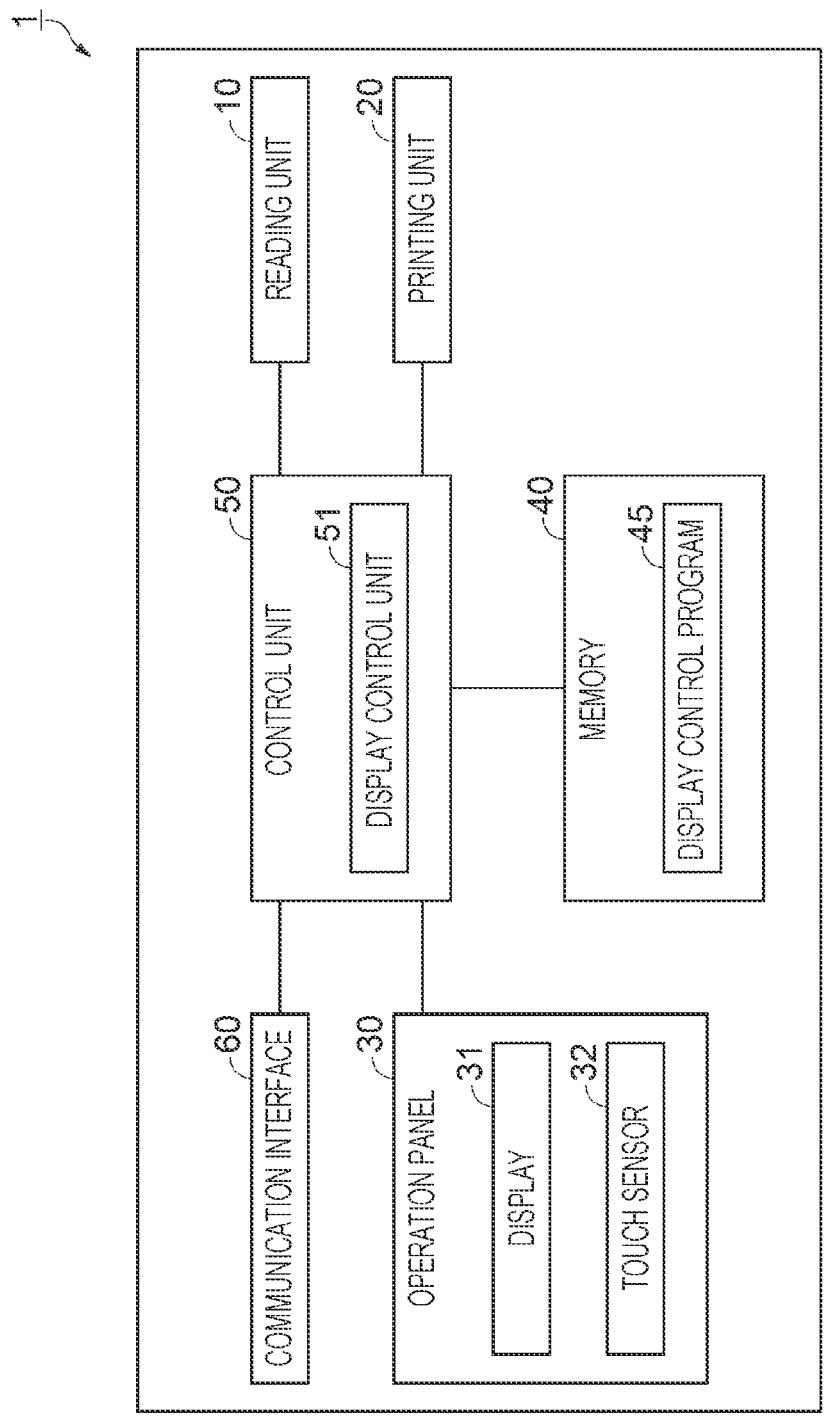
FIG. 2 is a diagram showing a functional block of the multifunction device.

FIG. 2 shows a functional block of the multifunction device 1.

The multifunction device 1 includes the reading unit 10, the printing unit 20, the operation panel 30, a memory 40, a control unit 50, and a communication interface 60.

The operation panel 30 includes a display 31 and a touch sensor 32. The display 31 is composed of a panel such as a liquid crystal panel and an organic electro-luminescence (EL), and displays the operation screen 100, the edit screen 105, and the like. The touch sensor 32 detects various touch operations input by a user. The operation panel 30 corresponds to a display section.

The memory 40 stores various programs such as a read control program that controls the operation of the reading unit 10, a print control program that controls the operation of the printing unit 20, and a display control program 45 that controls the display of the operation panel 30. The program may be composed of one or more packages. The memory 40 stores various data. The display control program 45 controls various displays to be displayed on the operation panel 30, such as a control for switching between the operation screen 100 and the edit screen 105, and a control for changing the display mode of the icon 110 selected on the edit screen 105. The display control program 45 corresponds to an example of a control program.

The memory 40 is composed of a semiconductor storage element such as a flash read only memory (ROM) or another type of non-volatile storage device. The memory 40 may include a random access memory (RAM) that constitutes a work area. The memory 40 may be composed of a magnetic storage device such as a hard disk drive (HDD) or a semiconductor storage device such as a solid state drive (SSD).

The control unit 50 controls each section of the multifunction device 1. The control unit 50 is a controller including a processor 27 shown in FIG. 1. The control unit 50 executes the program stored in the memory 40. The control unit 50 receives various instructions based on the user's touch operation input to the touch sensor 32 of the operation panel 30. The control unit 50 controls the reading unit 10, the printing unit 20, the operation panel 30, and the communication interface 60 based on the received instructions. The control unit 50 corresponds to a control section.

The control unit 50 includes a display control unit 51. The display control unit 51 is a functional section implemented by the control unit 50 executing the display control program 45. The display control unit 51 controls the operation panel 30 and controls the display mode of the image to be displayed on the display 31. The display control unit 51 receives various instructions based on the user's touch operation input to the touch sensor 32. The display control unit 51 performs processing for the icon 110 displayed on the display 31 of the operation panel 30 based on the received instruction. The processing for the icon 110 is selection, editing, or the like. The display control unit 51 controls the display or hide of the edited icon 110. The display control unit 51 controls screen switching based on the received instruction. The display control unit 51 displays the operation screen 100, the edit screen 105, and the like on the display 31 by controlling the screen switching. The display control unit 51 corresponds to a display control section.

The communication interface 60 communicates with an external device (not shown), transmits output data output from the control unit 50 to the external device, and receives input data from the external device. The external devices include server devices such as cloud servers and mail servers, personal computers, smartphones, and the like. The communication interface 60 may be connected in a wired manner via a cable, or may be connected in a wireless manner according to an Ethernet (registered trademark) standard or the like. When the multifunction device 1 has a fax function or a call function, the communication interface 60 connects to a telephone line. When the multifunction device 1 connects to a cloud server or a mail server, the communication interface 60 connects to the Internet communication network.

Figure 3:
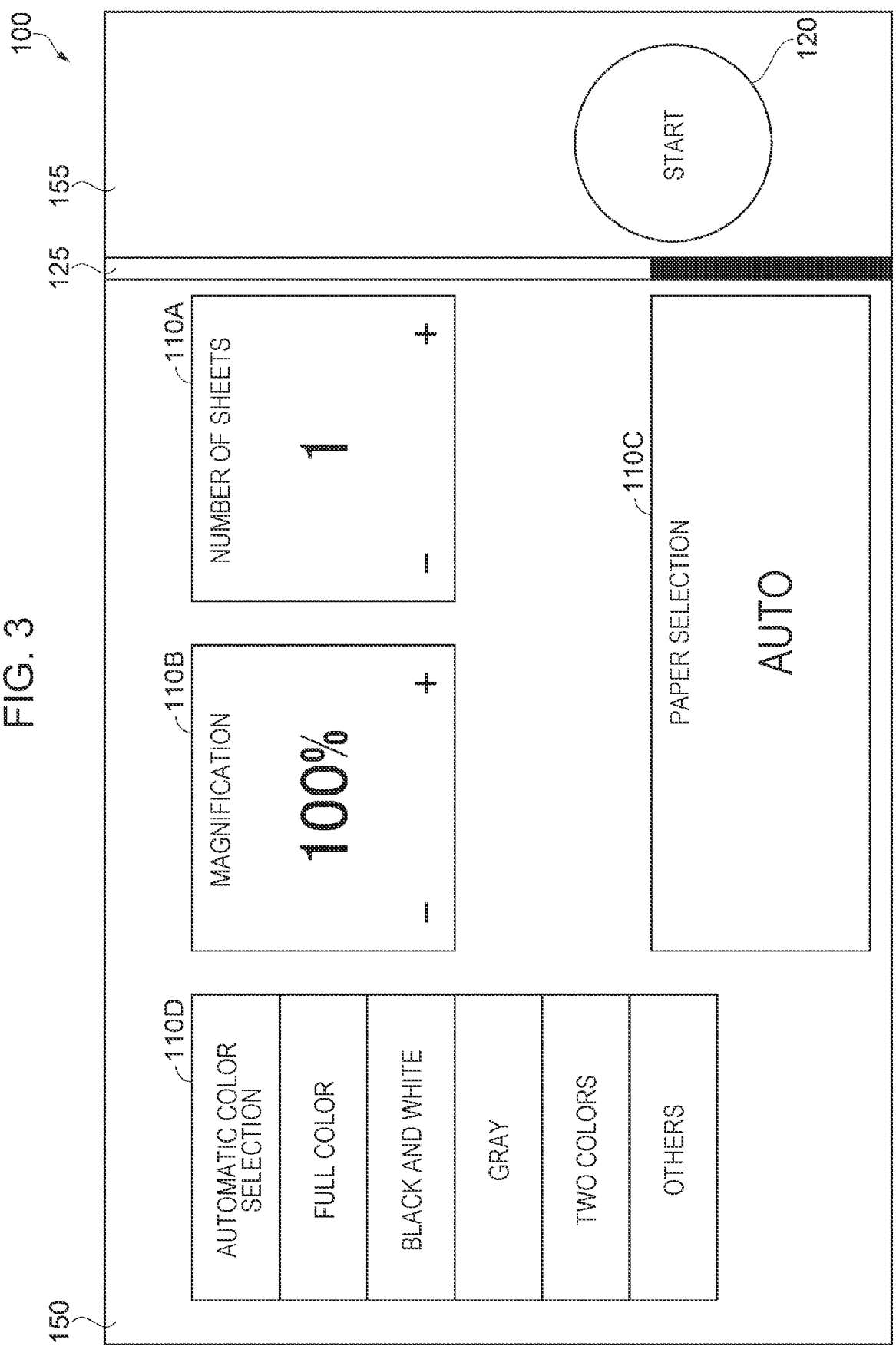
FIG. 3 is a diagram showing an operation screen displayed on an operation panel.

FIG. 3 shows the operation screen 100 displayed on the operation panel 30.

The operation screen 100 is a screen that accepts a user's touch operation and operates the multifunction device 1. The operation screen 100 accepts an execution instruction based on a user's touch operation input by the touch sensor 32. The execution instruction is transmitted to the control unit 50 by the operation panel 30, and instructs the control unit 50 to execute an operation or execute various settings for the reading unit 10, the printing unit 20, and the communication interface 60. The control unit 50 controls the operations of the reading unit 10, the printing unit 20, and the communication interface 60 based on the execution instruction. The execution instructions include execution instructions of various units and setting instructions of various units. The setting instruction involves instructing the settings for the reading unit 10, the printing unit 20, and the communication interface 60.

The operation panel 30 displays the operation screen 100 when the power of the multifunction device 1 is turned on or the like. The operation screen 100 displays the plurality of icons 110. The icon 110 has a plurality of types. The plurality of icons 110 displayed in FIG. 3 are a number-of-sheets designation icon 110A, a magnification designation icon 110B, a paper selection icon 110C, a color setting icon 110D, and a start instruction icon 120. The number of sheets designation, magnification designation, paper selection, color setting, and start instruction indicate the type of the icon 110. The icon 110 is a general term for various icons, and is used when various icons are not distinguished.

In FIG. 3, the number-of-sheets designation icon 110A and the magnification designation icon 110B are arranged along a first axis (not shown) of the operation screen 100. The number-of-sheets designation icon 110A and the paper selection icon 110C are arranged along a second axis orthogonal to the first axis (not shown) of the operation screen 100. In the present embodiment, the first axis is represented in a left-right direction, and the second axis is represented in a vertical direction. A direction from the number-of-sheets designation icon 110A to the magnification designation icon 110B is represented as a left direction, and a reverse direction thereof is represented as a right direction. A direction from the number-of-sheets designation icon 110A to the paper selection icon 110C is represented as a downward direction, and a reverse direction thereof is represented as an upward direction. A length along the first axis of the icon 110 or the like is represented as a horizontal length. A length along the second axis of the icon 110 or the like is represented as a vertical length.

The operation screen 100 displays a variable area 150, a fixed area 155, and a scroll bar 125. The variable area 150 is an area whose area changes depending on the arrangement of the icons 110. As an example, when a total length obtained by adding the vertical lengths of the plurality of icons 110 arranged in the vertical direction is longer than the vertical length of the operation panel 30, the operation screen 100 displays the scroll bar 125 to be described later. The fixed area 155 is an area in which the icons 110 that can be arranged are limited and the area of a background image does not increase. The icon 110 arranged in the fixed area 155 cannot be edited.

The number-of-sheets designation icon 110A accepts settings related to the number of sheets of printed matter to be printed when printing or copying is performed by the multifunction device 1. The number-of-sheets designation icon 110A may accept the number of sheets by the number of touch operations by the user. The number-of-sheets designation icon 110A may accept an instruction to display a number-of-sheets setting screen for inputting the number of sheets based on a user's touch operation, and may display the number-of-sheets setting screen on the operation panel 30. "1" displayed on the number-of-sheets designation icon 110A in FIG. 3 indicates that the set number of sheets is one.

The magnification designation icon 110B accepts settings related to the scaling of the printed matter to be printed when printing or copying is performed by the multifunction device 1. The scaling of the printed matter is enlargement or reduction of the original image printed on the printed matter. The magnification designation icon 110B may accept the magnification by the number of touch operations by the user. The magnification designation icon 110B may accept an instruction to display a magnification setting screen for inputting a magnification based on a user's touch operation, and may display the magnification setting screen on the operation panel 30. "100%" displayed on the magnification designation icon 110B in FIG. 3 indicates that the set magnification is 100%. 100% indicates that the magnification is the same as that of the original image.

The paper selection icon 110C accepts settings related to the medium to be fed to the printing unit 20 when printing or copying is performed by the multifunction device 1. The paper selection icon 110C may accept the selection of a paper feed source by the number of touch operations by the user. The paper selection icon 110C may accept an instruction to display a paper setting screen for selecting a paper feed source based on a user's touch operation, and may display the paper setting screen on the operation panel 30. The paper feed source includes an automatic selection to be determined by the control unit 50 based on the document at the time of copying or the print data at the time of printing. "Auto" displayed on the paper selection icon 110C in FIG. 3 indicates that the automatic selection of the paper feed source is selected.

The color setting icon 110D accepts settings related to the color of the printed matter to be printed when printing or copying is performed on the multifunction device 1. The color setting icon 110D displays "automatic color selection", "full color", "black and white", "gray", "two colors", and "others". When any of "automatic color selection", "full color", "black and white", "gray", "two colors", and "others" is selected by the user's touch operation, the color setting icon 110D accepts an instruction related to the color of the printed matter. When "black and white" is selected, the printing unit 20 generates a printed matter of a black and white image. When "automatic color selection" is selected, the control unit 50 selects any color printing, black-andwhite printing, and two-color printing based on the document or print data, and causes the printing unit 20 to execute the selected printing.

The start instruction icon 120 accepts instructions to execute various functions of the multifunction device 1. When the start instruction icon 120 accepts a user's touch operation, the operation panel 30 transmits an execution instruction to the control unit 50. Upon receiving the execution instruction, the control unit 50 controls the operations of one or more units of the reading unit 10, the printing unit 20, and the communication interface 60 based on the execution instruction.

The scroll bar 125 indicates the display position of the variable area 150 in the operation screen 100. When the vertical length of the variable area 150 is longer than the vertical length of the display 31 of the operation panel 30, the scroll bar 125 is displayed on the operation screen 100 under the control of the display control unit 51. The scroll bar 125 indicates the vertical position of the variable area 150. When the length obtained by adding the horizontal length of the variable area 150 to the horizontal length of the fixed area 155 is longer than the horizontal length of the operation panel 30, the operation screen 100 may display a second scroll bar (not shown) perpendicular to the scroll bar 125 displayed in FIG. 3. The second scroll bar indicates the horizontal position of the displayed variable area 150.

Figure 4:
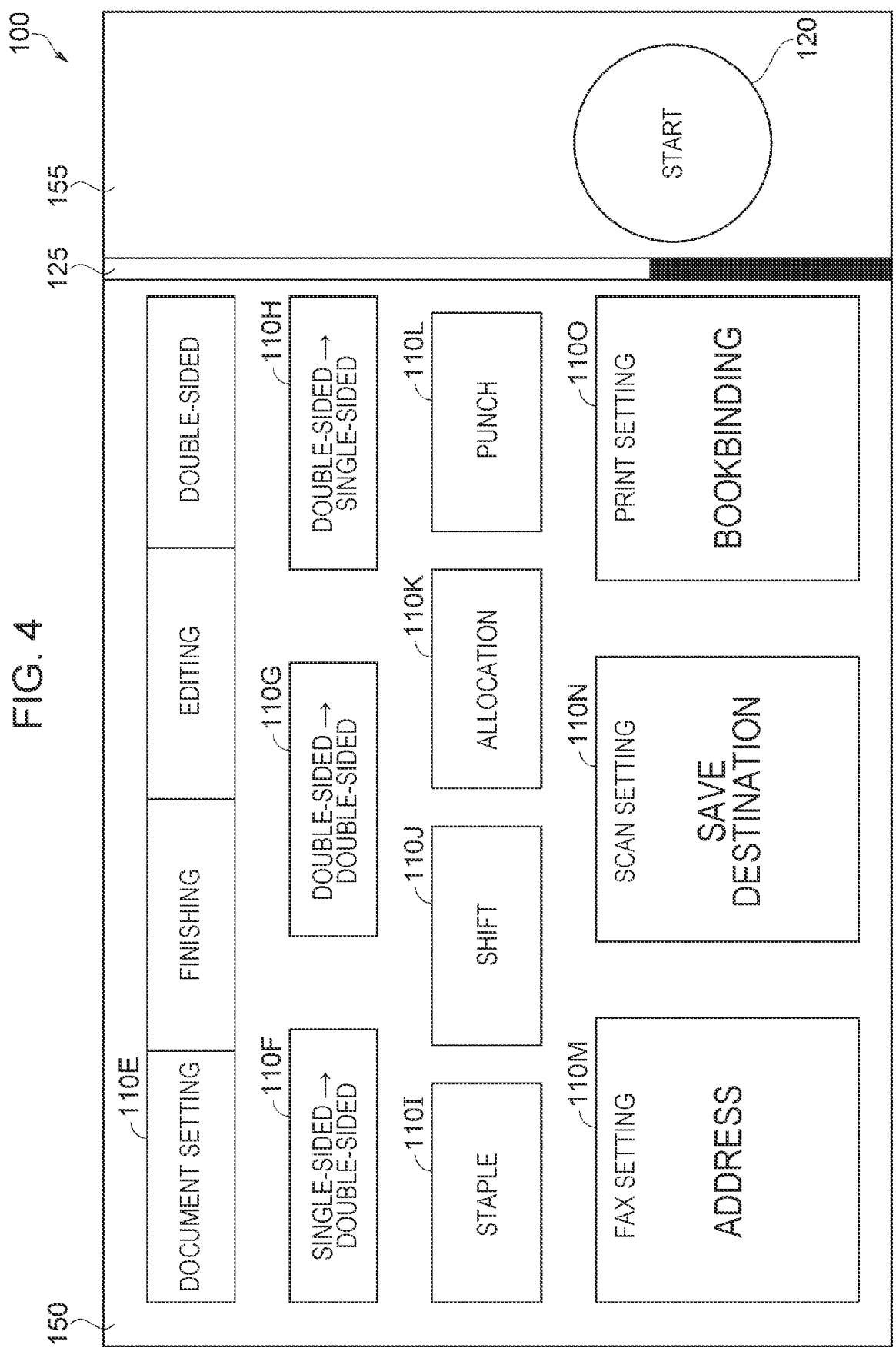
FIG. 4 is a diagram showing a scrolled operation screen.

FIG. 4 shows a scrolled operation screen 100.

The operation screen 100 of FIG. 4 is displayed when the operation screen 100 of FIG. 3 is scrolled downward.

The operation screen 100 of FIG. 4 displays, in the variable area 150, a printed matter designation icon 110E, a single-sided→double-sided setting icon 110F, a double-sided→double-sided setting icon 110G, a double-sided→single-sided setting icon 110H, a staple setting icon 110I, a shift setting icon 110J, an allocation setting icon 110K, a punch setting icon 110L, an address setting icon 110M, a save destination setting icon 110N, and a bookbinding setting icon 110O. The operation screen 100 of FIG. 4 displays the start instruction icon 120 in the fixed area 155.

The single-sided→double-sided setting icon 110F, the double-sided→double-sided setting icon 110G, and the double-sided→single-sided setting icon 110H relate to copy settings when the multifunction device 1 makes a copy. The staple setting icon 110I, the shift setting icon 110J, the allocation setting icon 110K, the punch setting icon 110L, and the bookbinding setting icon 110O relate to print settings when the multifunction device 1 performs printing. The staple setting icon 110I, the shift setting icon 110J, the punch setting icon 110L, and the bookbinding setting icon 110O relate to settings when the multifunction device 1 is provided with the post-processing mechanism. The address setting icon 110M relates to a fax setting when the multifunction device 1 has a fax function. The save destination setting icon 110N relates to a scan setting when the multifunction device 1 has a scanning function of generating and saving read data.

The printed matter designation icon 110E accepts settings related to the process of the printed matter to be printed when printing or copying is performed by the multifunction device 1 or the operation of the reading unit 10. The printed matter designation icon 110E displays "document setting", "finishing", "editing", and "double-sides". When any one of "document setting", "finishing", "editing", and "double-sided" is selected by a user's touch operation, the operation panel 30 displays various setting screens. The various setting screens display the icon 110. When "document setting" is selected, the operation panel 30 displays a document setting screen. When "finishing" is selected, the operation panel 30 displays a finishing setting screen. When "editing" is selected, the operation panel 30 displays an edit setting screen. When "double-sided" is selected, the operation panel 30 displays a double-sided setting screen. The printed matter designation icon 110E is a folder icon that displays the icon 110 in a lower hierarchy when a user's touch operation is performed.

The single-sided→double-sided setting icon 110F accepts a copy setting for reading one side of a document placed on the reading unit 10 and performing double-sided printing. When the single-sided→double-sided setting icon 110F accepts a user's touch operation, the copy operation is set for the multifunction device 1. The copy operation to be set is an operation in which the reading unit 10 reads one side of the document and the printing unit 20 performs double-sided printing based on the read data read by the reading unit 10.

The double-sided→double-sided setting icon 110G accepts a copy setting for reading both sides of a document placed on the reading unit 10 and performing double-sided printing. When the double-sided→double-sided setting icon 110G accepts a user's touch operation, the copy operation is set for the multifunction device 1. The copy operation to be set is an operation in which the reading unit 10 reads both sides of the document and the printing unit 20 performs double-sided printing based on the read data read by the reading unit 10.

The double-sided→single-sided setting icon 110H accepts a copy setting for reading both sides of a document placed on the reading unit 10 and performing single-sided printing. When the double-sided→single-sided setting icon 110H accepts a user's touch operation, the copy operation is set for the multifunction device 1. The copy operation to be set is an operation in which the reading unit 10 reads both sides of the document and the printing unit 20 performs single-sided printing based on the read data read by the reading unit 10.

The staple setting icon 110I accepts settings related to staples performed by the post-processing mechanism. The staple setting icon 110I may cause the control unit 50 to transmit an instruction to execute the staple process to the printing unit 20 when the user's touch operation is accepted. The staple setting icon 110I may display a staple processing setting screen for accepting the setting related to the staple process on the operation panel 30 when the user's touch operation is accepted.

The shift setting icon 110J accepts settings related to shift paper ejection performed by the post-processing mechanism. The shift setting icon 110J may cause the control unit 50 to transmit an instruction to execute the shift paper ejection process to the printing unit 20 when the user's touch operation is accepted. The shift setting icon 110J may display a shift paper ejection processing setting screen for accepting the setting related to the shift paper ejection process on the operation panel 30 when the user's touch operation is accepted.

The allocation setting icon 110K accepts settings related to allocation printing performed by the printing unit 20. The allocation setting icon 110K may cause the control unit 50 to transmit an instruction to execute allocation printing to the printing unit 20 when the user's touch operation is accepted. The allocation setting icon 110K may display an allocation print setting screen for accepting the setting related to the allocation printing on the operation panel 30 when the user's touch operation is accepted.

The punch setting icon 110L accepts settings related to punches performed by the post-processing mechanism. The punch setting icon 110L may cause the control unit 50 to transmit an instruction to execute the punch process to the printing unit 20 when the user's touch operation is accepted. The punch setting icon 110L may display a punch processing setting screen for accepting the setting related to the punch process on the operation panel 30 when the user's touch operation is accepted.

The address setting icon 110M accepts settings related to fax communication performed via the communication interface 60. The address setting icon 110M may display an address list, which is a list of destinations to be transmitted at the time of fax communication, on the operation panel 30 when the user's touch operation is accepted. The address setting icon 110M may display a transmission destination setting screen for setting destinations to be transmitted at the time of fax communication on the operation panel 30 when the user's touch operation is accepted. The address setting icon 110M is an example of a folder icon.

The save destination setting icon 110N accepts settings related to the save destination of the read data acquired in the scan process. The save destination setting icon 110N may cause the control unit 50 to transmit an instruction to save the read data to the memory 40 when the user's touch operation is accepted. The save destination setting icon 110N may display a save destination setting screen for accepting the setting related to the save destination of the read data on the operation panel 30 when the user's touch operation is accepted.

The bookbinding setting icon 110O accepts settings related to the bookbinding process of the printed matter to be printed when printing or copying is performed by the multifunction device 1. The bookbinding setting icon 110O may cause the control unit 50 to transmit an instruction to execute bookbinding when the user's touch operation is accepted. The bookbinding setting icon 110O may display a bookbinding setting screen for accepting the setting related to bookbinding on the operation panel 30 when the user's touch operation is accepted.

Figure 5:
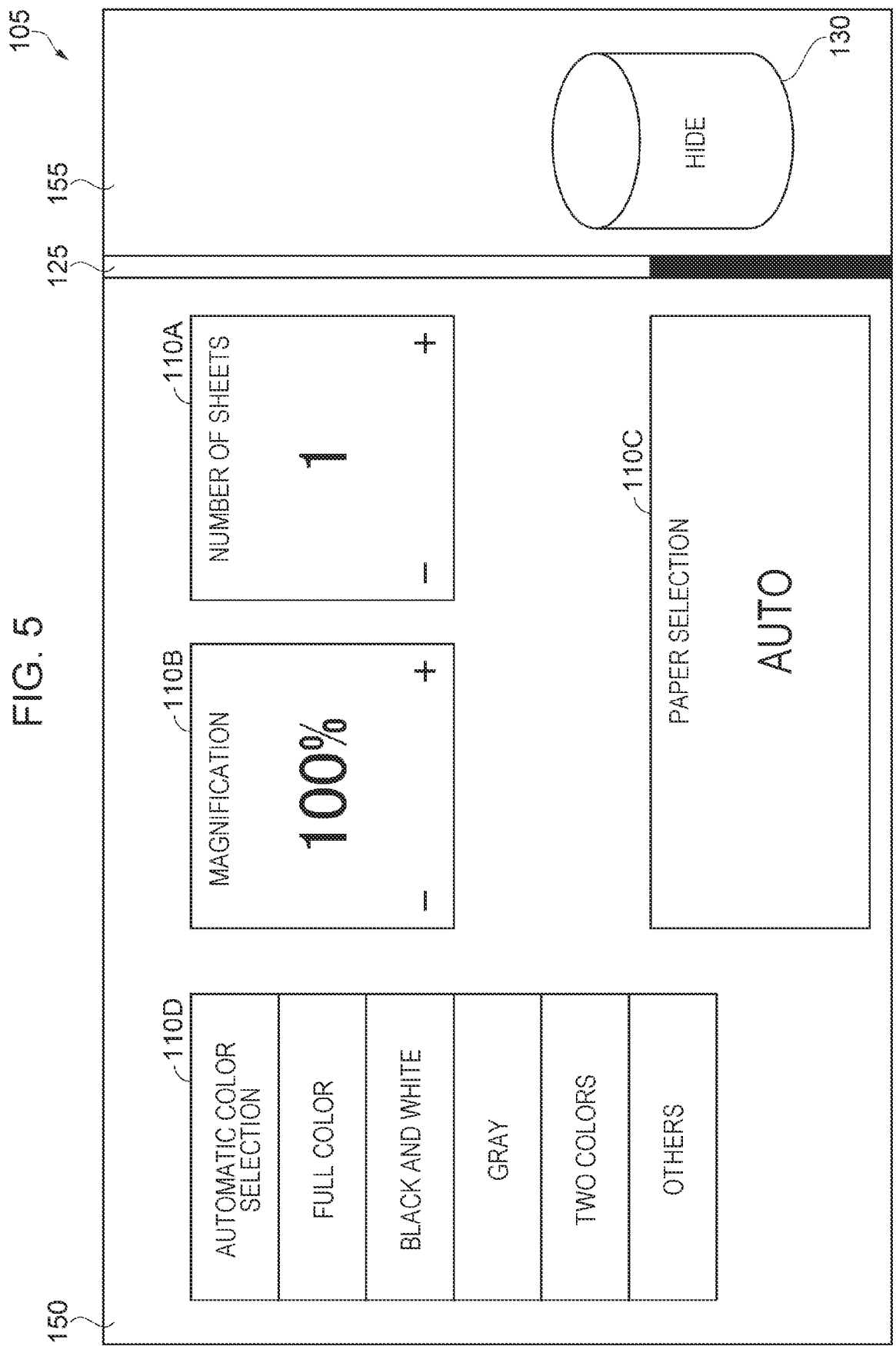
FIG. 5 is a diagram showing an edit screen displayed on the operation panel.

FIG. 5 shows an edit screen 105 displayed on the operation panel 30.

The edit screen 105 is a screen that accepts a user's touch operation and edits an image displayed on the display 31 of the operation panel 30. The image to be edited is an icon 110, a background image of the operation screen 100, and various images displayed on the operation screen 100. Editing the image includes moving the icon 110, switching between display/hide, transforming the image, changing the color, deleting the image, changing the size, changing the image position, and the like.

The operation panel 30 switches from the operation screen 100 to the edit screen 105 under the control of the display control unit 51. The edit screen 105 accepts a selection instruction of the icon 110 and an edit instruction. The edit screen 105 includes the variable area 150 and the fixed area 155, similar to the operation screen 100. The edit screen 105 of FIG. 5 displays the number-of-sheets designation icon 110A, the magnification designation icon 110B, the paper selection icon 110C, and the color setting icon 110D, similar to the operation screen 100 of FIG. 3. The edit screen 105 displays a hide setting icon 130 instead of the start instruction icon 120. The start instruction icon 120 is not displayed on the edit screen 105 and cannot be edited. The start instruction icon 120 is not subject to editing. The variable area 150 is an editable area in which the icon 110 can be edited.

The hide setting icon 130 sets the icon 110 to be hidden. The hide setting icon 130 is displayed in the fixed area 155. Among the plurality of icons 110 displayed on the edit screen 105, when the hide setting icon 130 is dropped by the user's touch operation on the selected icon 110, the selected icon 110 is set to be hidden. The hide setting icon 130 is not displayed on the operation screen 100. The hide setting icon 130 is displayed on the edit screen 105, but cannot be edited. The hide setting icon 130 is not subject to editing.

The edit screen 105 accepts a selection instruction and an edit instruction. The selection instruction is an instruction to select the icon 110 by the operation of the user. The edit instruction is an instruction related to various edits such as a movement instruction, a hide instruction, and a size change instruction.

The selection instruction is output as a user's touch operation based on a tap operation to the icon 110. The selection instruction selects the icon 110 to be edited. When two or more icons 110 are selected by the operation of the user, the selection instruction selects the selected two or more icons as a selection icon group.

The movement instruction included in the edit instruction is output as a user's touch operation based on a slide operation or a drag operation to the selected icon 110. The movement instruction moves the icon 110 or the selection icon group selected by the selection instruction.

The hide instruction included in the edit instruction is output as a user's touch operation when the selected icon 110 is dropped on the hide setting icon 130 by a drag and drop operation. The hide instruction sets the icon 110 or the selection icon group selected by the selection instruction to be hidden. The state at the time of operation will be described later.

The size change instruction included in the edit instruction is output as a user's touch operation based on a pinch-in operation or a pinch-out operation of the selected icon 110. The size change instruction is an instruction to enlarge or reduce the selected icon 110.

First Embodiment

Figure 6:
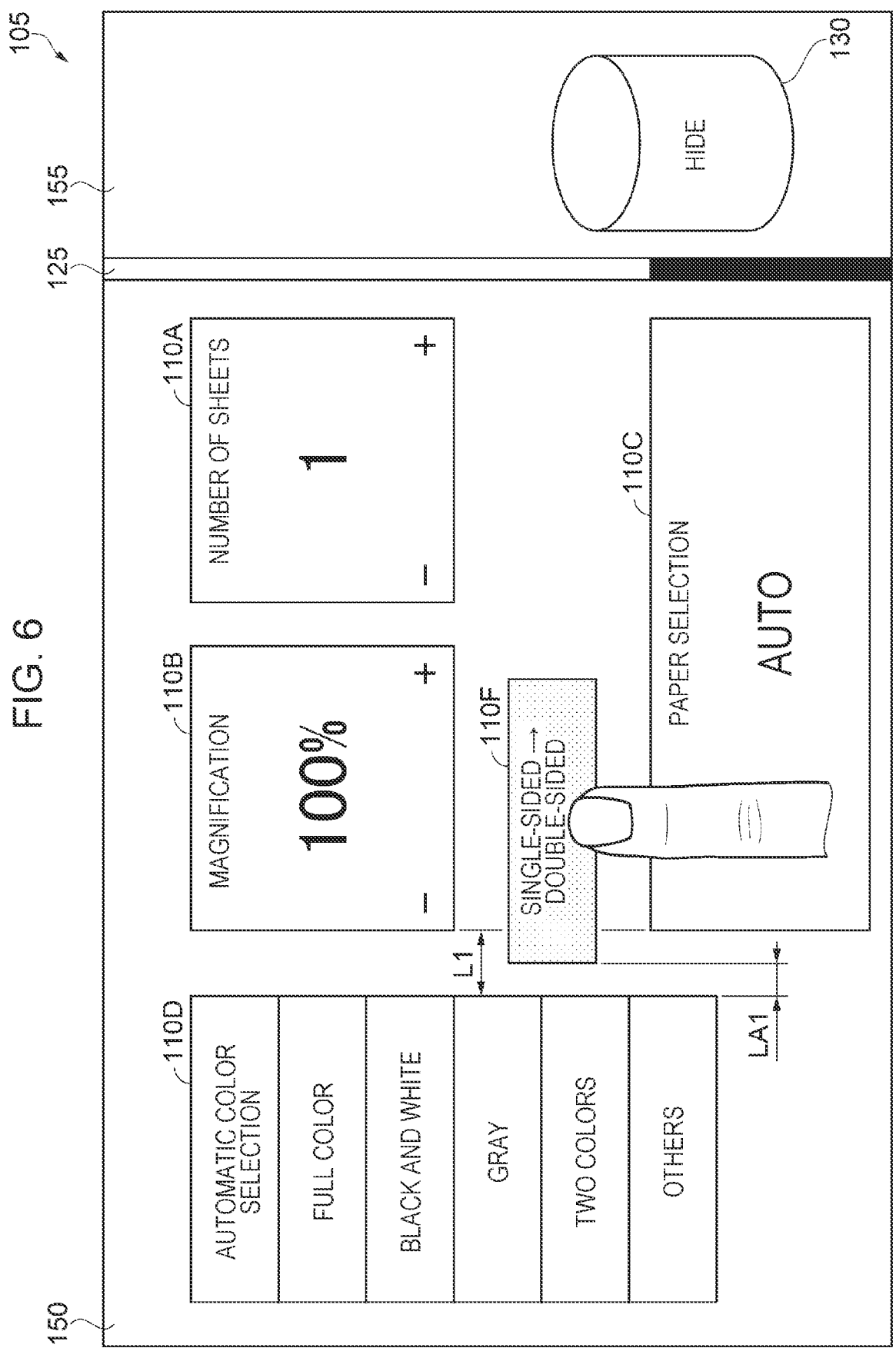
FIG. 6 is a diagram showing the edit screen at the time of a movement operation.

FIG. 6 shows the edit screen 105 at the time of a movement operation.

FIG. 6 shows a state in which a movement instruction is accepted based on a user's touch operation. The movement instruction in FIG. 6 is an instruction to move the single-sided→double-sided setting icon 110F to the right of the color setting icon 110D. The movement instruction in FIG. 6 is an instruction to set an inter-icon distance LA1 between the single-sided→double-sided setting icon 110F and the color setting icon 110D. The inter-icon distance LA1 is a distance along the first axis. The left-right direction along the first axis corresponds to an example of a predetermined direction. The single-sided→double-sided setting icon 110F corresponds to an example of a first icon. The color setting icon 110D corresponds to an example of a second icon.

When the operation screen 100 is switched to the edit screen 105, the operation screen 100 of FIG. 4 is switched to the edit screen 105 (not shown). The position of each icon 110 included in the edit screen 105 based on the operation screen 100 of FIG. 4 is the same as the position of each icon 110 included in the operation screen 100 of FIG. 4, except for the start instruction icon 120. The start instruction icon 120 is not displayed on the edit screen 105. The position of the single-sided→double-sided setting icon 110F shown in FIG. 4 corresponds to a first position.

A distance L1 shown in FIG. 6 is a distance along the first axis, is predetermined, and is stored in the memory 40. The distance L1 corresponds to an example of a first distance.

The single-sided→double-sided setting icon 110F in FIG. 6 indicates that an instruction to move to the position of the inter-icon distance LA1 shorter than the distance L1 is accepted. The position of the single-sided→double-sided setting icon 110F shown in FIG. 6 corresponds to a second position.

Figure 7:
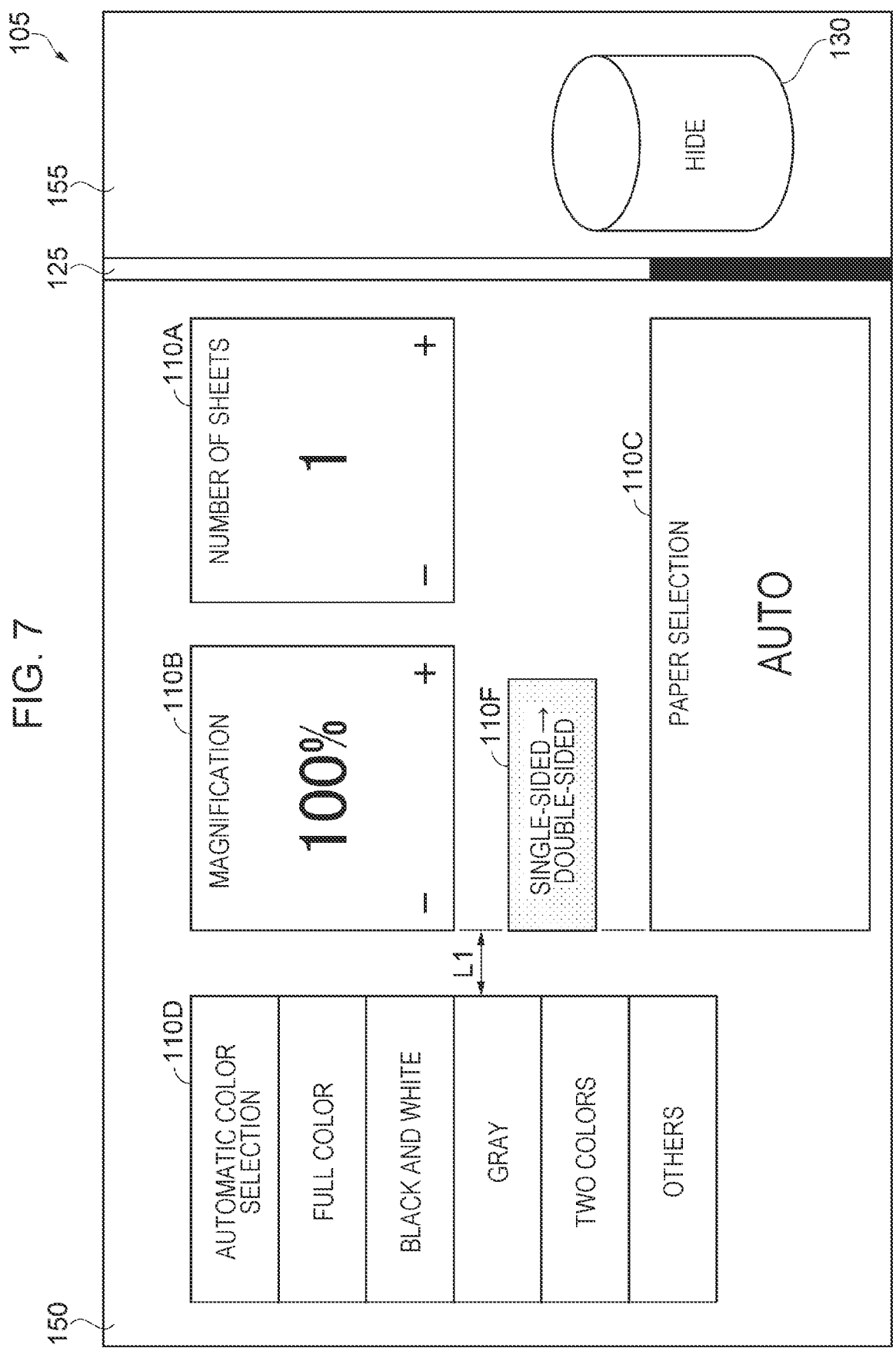
FIG. 7 is a diagram showing the edit screen after the movement operation.

FIG. 7 shows the edit screen 105 after the movement operation.

FIG. 7 shows a state when the single-sided→double-sided setting icon 110F is moved to the right of the color setting icon 110D. The inter-icon distance LA1 between the single-sided→double-sided setting icon 110F and the color setting icon 110D in FIG. 7 is set to the distance L1. As shown in FIG. 6, in the movement instruction based on the user operation, the inter-icon distance LA1 between the single-sided→double-sided setting icon 110F and the color setting icon 110D is shorter than the distance L1. The horizontal length of the single-sided→double-sided setting icon 110F in FIG. 7 is shorter than the horizontal length of the single-sided→double-sided setting icon 110F in FIG. 6. When the single-sided→double-sided setting icon 110F is moved to the second position, the display control unit 51 reduces and shortens the horizontal length of the single-sided→double-sided setting icon 110F. The display control unit 51 expands the inter-icon distance LA1 to the distance L1 by shortening the horizontal length of the single-sided-→double-sided setting icon 110F. FIG. 7 shows a case where the length of the single-sided→double-sided setting icon 110F in the left-right direction is changed based on the inter-icon distance LA1 between the single-sided→double-sided setting icon 110F for which the movement instruction has accepted and the color setting icon 110D adjacent thereto in the left-right direction.

When the inter-icon distance between the adjacent icons at the movement position designated by the movement instruction is shorter than the predetermined distance L1, the display control unit 51 expands the inter-icon distance LA1 to the distance L1. When the inter-icon distance LA1 is smaller than a predetermined first distance, the display control unit 51 reduces the length of the first icon in a predetermined direction, and sets the inter-icon distance LA1 to be equal to or greater than the first distance. By expanding the inter-icon distance LA1, the user can easily distinguish between the single-sided→double-sided setting icon 110F and the color setting icon 110D. The visibility of the single-sided→double-sided setting icon 110F and the color setting icon 110D is improved. The user is less likely to mistakenly operate the single-sided→double-sided setting icon 110F and the color setting icon 110D.

FIG. 7 shows a case where the inter-icon distance LA1 between the single-sided→double-sided setting icon 110F and the color setting icon 110D is set to the distance L1, but the present disclosure is not limited thereto. By widening the inter-icon distance LA1 to L1 or more, the user can further easily distinguish between the single-sided→double-sided setting icon 110F and the color setting icon 110D.

In FIG. 7, the position of the right side of the single-sided→double-sided setting icon 110F is fixed, and the position of the left side thereof is changed to change the horizontal length of the single-sided→double-sided setting icon 110F, but the present disclosure is not limited thereto. The center position of the single-sided→double-sided setting icon 110F may be fixed, and the positions of the left side and the right side may be changed to change the horizontal length of the single-sided→double-sided setting icon 110F.

Figure 8:
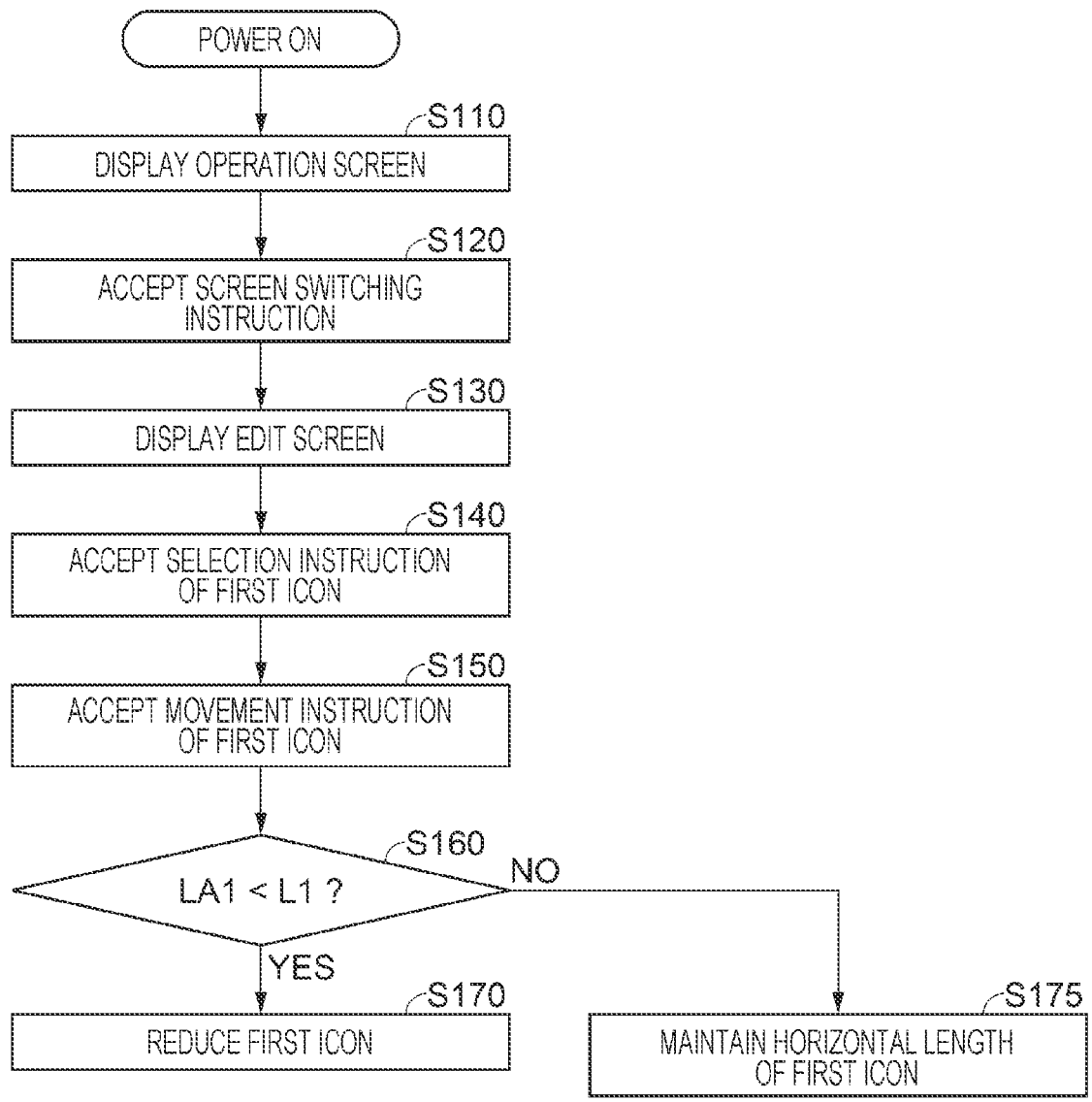
FIG. 8 is a diagram showing a flowchart at the time of the movement operation.

FIG. 8 shows a flowchart at the time of the movement operation.

A control method of the multifunction device 1 according to FIG. 8 is performed by the processor 27 of the display control unit 51 reading the display control program 45 from the memory 40 and executing the display control program 45.

When the user turns on the power of the multifunction device 1, the operation panel 30 displays the operation screen 100 under the control of the display control unit 51, as shown in step S110 of FIG. 8. The timing at which the operation panel 30 displays the operation screen 100 is not limited to when the power is turned on. When the multifunction device 1 is provided with the power saving mode, the operation panel 30 may display the operation screen 100 at the timing when the power saving mode is switched to the normal mode.

In a state in which the operation panel 30 displays the operation screen 100, the multifunction device 1 accepts a user's screen switching instruction as shown in step S120. The screen switching instruction is a command instructing that the operation screen 100 displayed on the operation panel 30 is switched to the edit screen 105 under the control of the display control unit 51. The multifunction device 1 accepts the screen switching instruction by a touch operation of the user on the operation panel 30. An example of the touch operation is a long-press touch operation on the operation screen 100 by the user. Acceptance of the screen switching instruction is not limited to touch operations on the operation panel 30. When the multifunction device 1 is provided with a screen switching instruction button and the user operates the screen switching instruction button, the multifunction device 1 may accept the screen switching instruction.

As shown in step S130, the display control unit 51 switches the operation screen 100 displayed on the operation panel 30 to the edit screen 105 when the screen switching instruction is accepted. The operation panel 30 displays the edit screen 105. The displayed edit screen 105 displays the number-of-sheets designation icon 110A, the magnification designation icon 110B, the paper selection icon 110C, and the color setting icon 110D in the variable area 150. When a scroll operation is performed on the edit screen 105, the edit screen 105 displays the printed matter designation icon 110E, the single-sided→double-sided setting icon 110F, the double-sided→double-sided setting icon 110G, the double-sided→single-sided setting icon 110H, the staple setting icon 110I, the shift setting icon 110J, the allocation setting icon 110K, the punch setting icon 110L, the address setting icon 110M, the save destination setting icon 110N, and the bookbinding setting icon 110O. When the display control unit 51 switches from the operation screen 100 to the edit screen 105, the operation panel 30 displays the icon 110 displayed in the variable area 150 in the same display mode. The icon 110 displayed in the variable area 150 is displayed at the same position as the operation screen 100.

The operation panel 30 accepts a user's touch operation in a state in which the edit screen 105 is displayed. The display control unit 51 accepts a selection instruction of the icon 110 as shown in step S140 based on the user's touch operation. In the case of the first embodiment, the icon 110 that accepts the selection instruction is the single-sided→double-sided setting icon 110F. The single-sided→double-sided setting icon 110F is arranged at the first position when accepting a selection instruction. The single-sided→double-sided setting icon 110F corresponds to an example of a first icon.

As shown in step S150, the display control unit 51 accepts a movement instruction of the selected icon 110 based on a user's touch operation. The movement instruction is a movement instruction from the first position to the second position. The position of the single-sided→double-sided setting icon 110F shown in FIG. 6 corresponds to a second position.

When the user instructs the single-sided→double-sided setting icon 110F to move from the first position to the second position, in step S160, the display control unit 51 determines whether or not the inter-icon distance LA1 between the icons 110 adjacent to each other in the left-right direction and the icon 110 moving to the second position is shorter than the distance L1. In the case of FIG. 6, it is determined whether or not the inter-icon distance LA1 between the single-sided→double-sided setting icon 110F and the color setting icon 110D is shorter than the predetermined distance L1.

When the inter-icon distance LA1 is shorter than the distance L1, the process proceeds to step S170. When the moving icon 110 overlaps another icon 110 at the second position, it is determined that the inter-icon distance LA1 is shorter than the distance L1, and the process proceeds to step S170. When the inter-icon distance LA1 is wider than the distance L1, the process proceeds to step S175. When there is no icon 110 that is adjacent to the moving icon 110 in the left-right direction at the second position, the process proceeds to step S175. In the case of FIG. 6, the inter-icon distance LA1 between the single-sided→double-sided setting icon 110F and the color setting icon 110D is shorter than the predetermined distance L1. In the case of FIG. 6, the process proceeds to step S170.

In step S170, the display control unit 51 reduces the horizontal length of the moving icon 110. The display control unit 51 sets the inter-icon distance LA1 between the moving icon 110 and the icons 110 adjacent to each other at the second position to be the distance L1 or more. In the case of FIG. 7, the display control unit 51 shortens the horizontal length of the single-sided→double-sided setting icon 110F, and sets the inter-icon distance LA1 between the single-sided→double-sided setting icon 110F and the color setting icon 110D to the distance L1. By expanding the inter-icon distance LA1 between the single-sided→double-sided setting icon 110F and the color setting icon 110D, the user can easily distinguish between the single-sided→double-sided setting icon 110F and the color setting icon 110D, and the visibility is improved.

In step S175, the display control unit 51 moves the icon 110 for which the movement instruction has accepted to the second position. The horizontal length of the icon 110 that moves to the second position is maintained and does not change.

Second Embodiment

Figure 9:
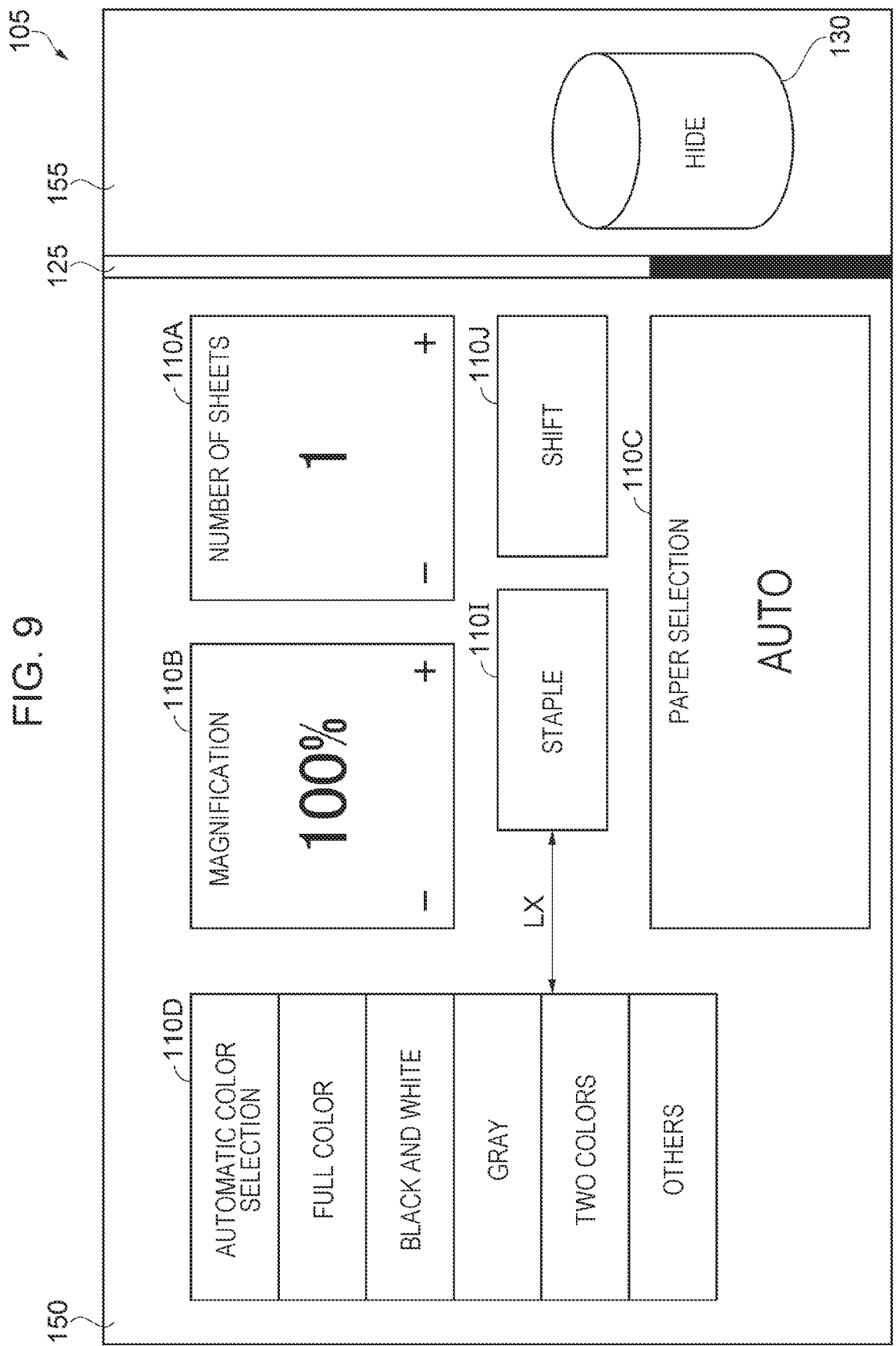
FIG. 9 is a diagram showing the edit screen displayed on the operation panel.

FIG. 9 shows an edit screen 105 displayed on the operation panel 30 according to a second embodiment. The layout of the plurality of icons 110 displayed on the edit screen 105 of FIG. 9 is different from the layout of the plurality of icons 110 displayed on the edit screen 105 of FIG. 5.

The edit screen 105 of FIG. 9 displays the number-of-sheets designation icon 110A, the magnification designation icon 110B, the paper selection icon 110C, the color setting icon 110D, the staple setting icon 110I, and the shift setting icon 110J in the variable area 150. The edit screen 105 of FIG. 9 displays the hide setting icon 130 in the fixed area 155. The edit screen 105 of FIG. 9 is set by moving the staple setting icon 110I and the shift setting icon 110J to the edit screen 105 of FIG. 5. In FIG. 9, the distance between the color setting icon 110D and the staple setting icon 110I along the first axis is a distance LX. The left-right direction along the first axis corresponds to an example of a predetermined direction.

Figure 10:
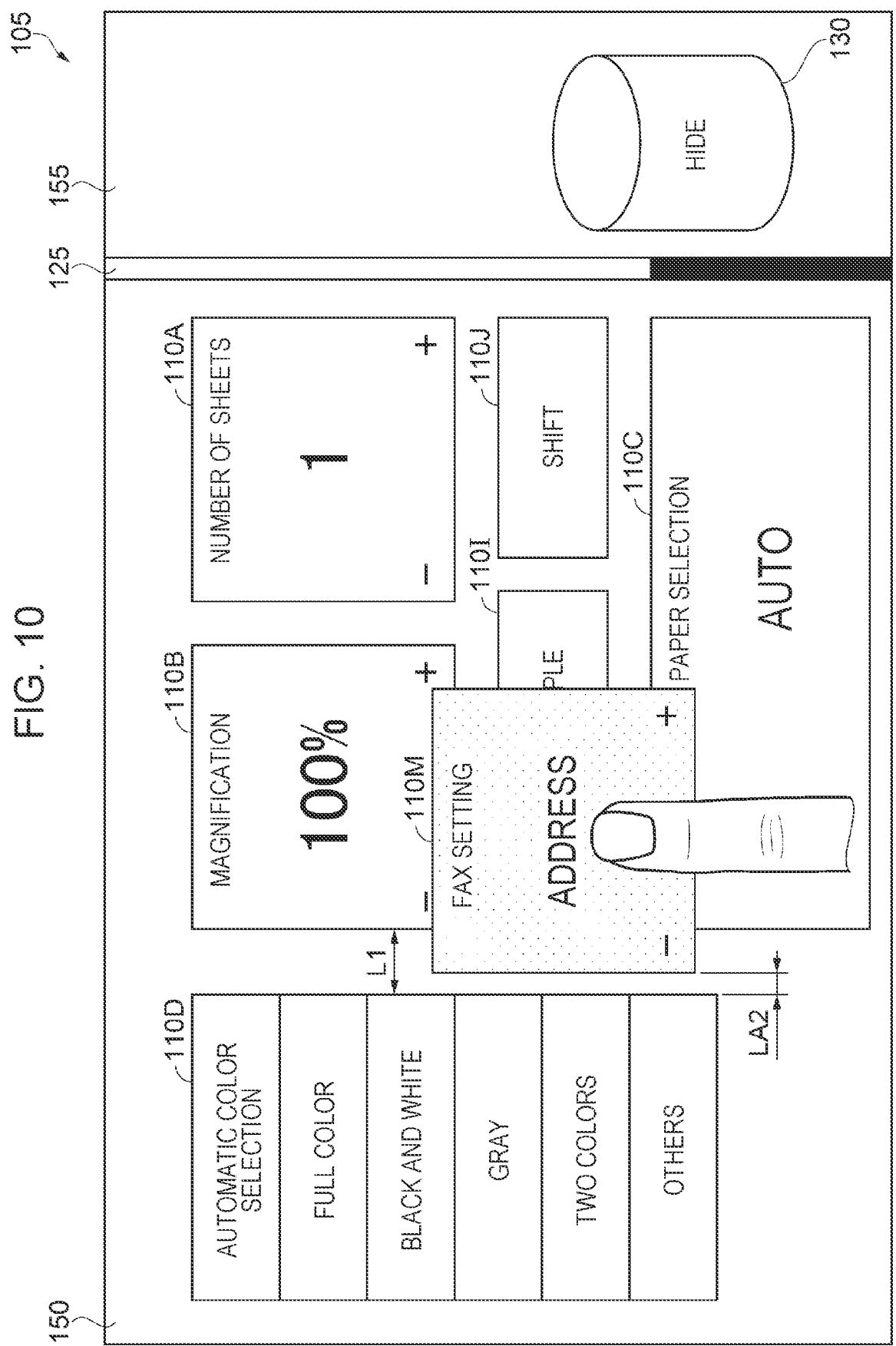
FIG. 10 is a diagram showing the edit screen at the time of a movement operation.

FIG. 10 shows the edit screen 105 at the time of a movement operation. FIG. 10 shows a case where the address setting icon 110M is moved to the edit screen 105 of FIG. 9. FIG. 10 shows a case where the address setting icon 110M is instructed to move between the color setting icon 110D and the staple setting icon 110I. The position between the color setting icon 110D and the staple setting icon 110I corresponds to a second position.

An inter-icon distance LA2 between the address setting icon 110M and the color setting icon 110D shown in FIG. 10 is shorter than the distance L1. Since the address setting icon 110M and the staple setting icon 110I overlap each other, an inter-icon distance LA3 (not shown) between the address setting icon 110M and the staple setting icon 110I is shorter than the distance L1. When the address setting icon 110M is moved to a position between the color setting icon 110D and the staple setting icon 110I, the display control unit 51 reduces the address setting icon 110M. The display control unit 51 reduces a horizontal length W1 of the address setting icon 110M to a horizontal length W2. Assuming that the distance between the color setting icon 110D and the staple setting icon 110I along the first axis is the distance LX, the display control unit 51 reduces the horizontal length W1 of the address setting icon 110M to the horizontal length $W2 \leq LX - 2 \times L1$. At this time, when the horizontal length W2 becomes shorter than a predetermined threshold value, the display control unit 51 prohibits the movement of the address setting icon 110M. As an example, when the horizontal length W2 of the reduced address setting icon 110M is equal to or less than half the length of the horizontal length W1 of the address setting icon 110M, the display control unit 51 prohibits the movement of the address setting icon 110M. The threshold value may be set by a relative length or may be set by a predetermined length.

The display control unit 51 prohibits the movement of the icon 110 when the horizontal length of the moving icon 110 is reduced to be shorter than a predetermined threshold value. It is possible to prevent the visibility of the icon 110 from being reduced due to the horizontal length of the moving icon 110 being too short. In addition, the multifunction device 1 can prevent the length of the first icon in a predetermined direction from becoming smaller than the threshold value and reducing the operability of the first icon.

Third Embodiment

Figure 11:
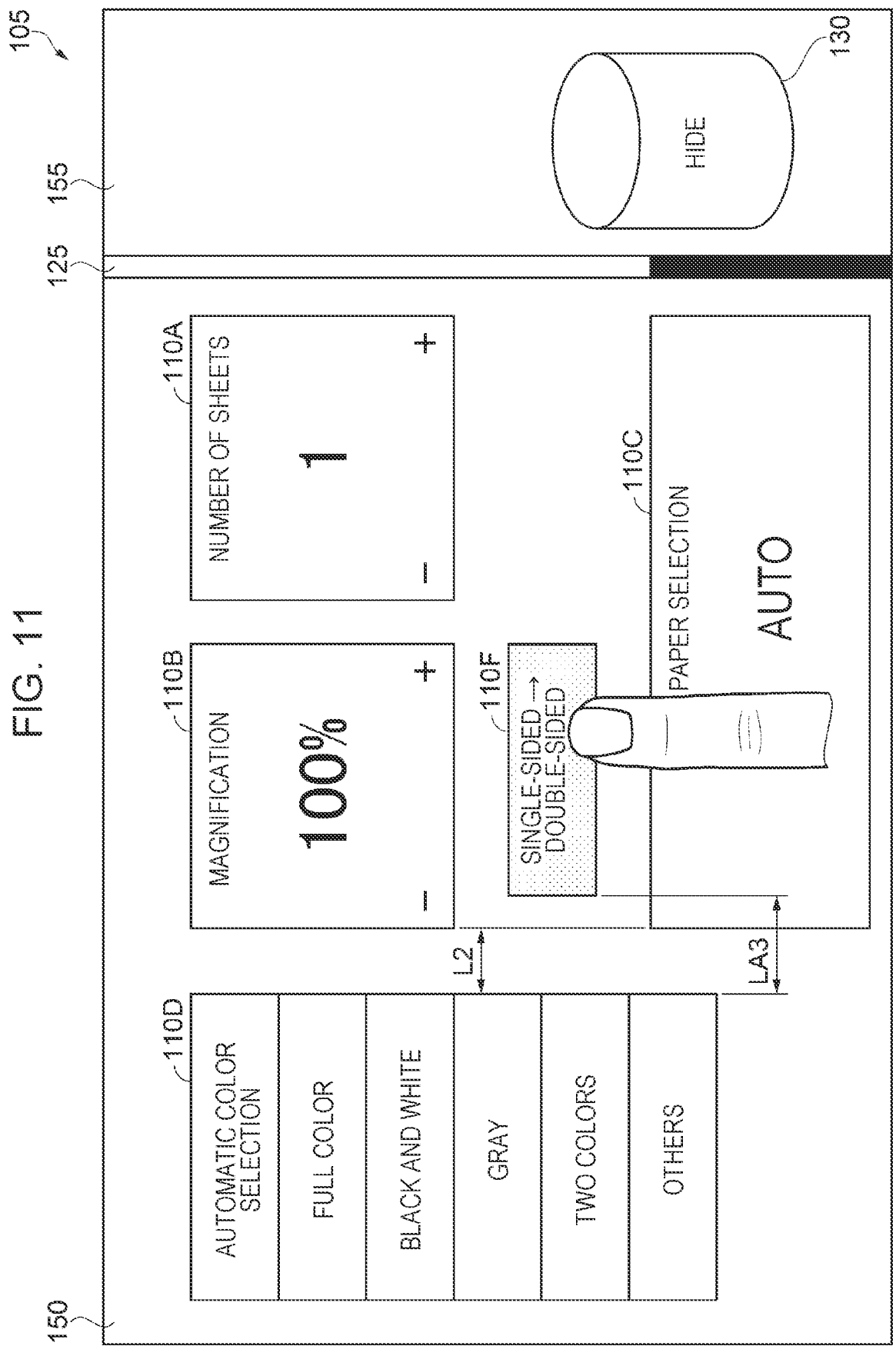
FIG. 11 is a diagram showing the edit screen at the time of a movement operation.

FIG. 11 shows the edit screen 105 at the time of a movement operation.

FIG. 11 shows a state in which a movement instruction is accepted based on a user's touch operation. The movement instruction in FIG. 11 is an instruction to move the single-sided→double-sided setting icon 110F to the right of the color setting icon 110D. The movement instruction in FIG. 11 is an instruction to set the inter-icon distance LA3 between the single-sided→double-sided setting icon 110F and the color setting icon 110D. The inter-icon distance LA3 is a distance along the first axis. The left-right direction along the first axis corresponds to an example of a predetermined direction. The single-sided→double-sided setting icon 110F corresponds to an example of a first icon. The color setting icon 110D corresponds to an example of a second icon.

When the operation screen 100 is switched to the edit screen 105, the operation screen 100 of FIG. 4 is switched to the edit screen 105 (not shown). The position of each icon 110 included in the edit screen 105 based on the operation screen 100 of FIG. 4 is the same as the position of each icon 110 included in the operation screen 100 of FIG. 4, except for the start instruction icon 120. The start instruction icon 120 is not displayed on the edit screen 105. The position of the single-sided→double-sided setting icon 110F shown in FIG. 4 corresponds to a first position.

A distance L2 shown in FIG. 11 is a distance along the first axis, is predetermined, and is stored in the memory 40. The distance L2 corresponds to an example of a second distance. The single-sided→double-sided setting icon 110F in FIG. 11 indicates that an instruction to move to the position of the inter-icon distance LA3 wider than the distance L2 is accepted. The position of the single-sided-→double-sided setting icon 110F shown in FIG. 11 corresponds to a second position.

Figure 12:
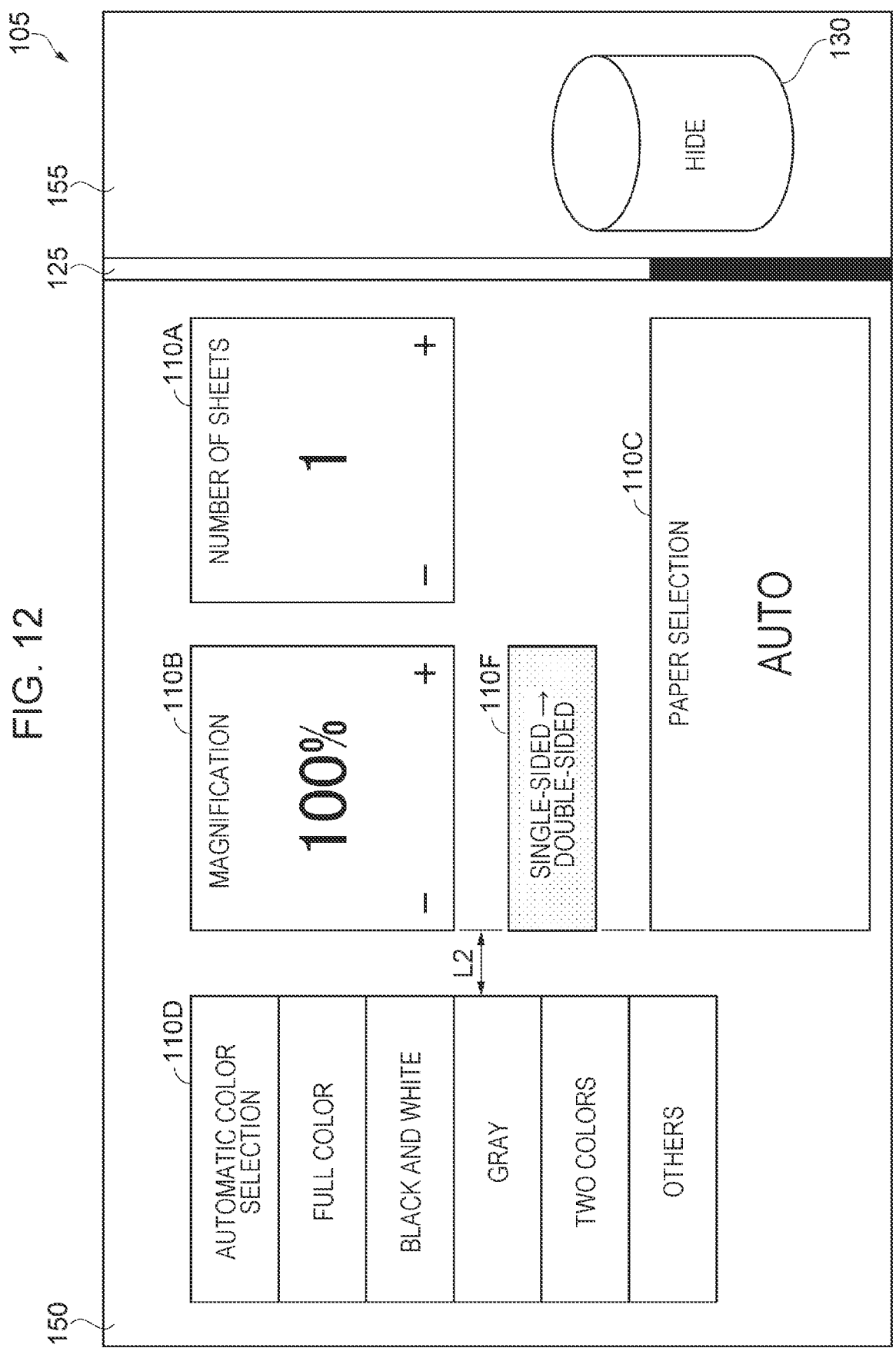
FIG. 12 is a diagram showing the edit screen after the movement operation.

FIG. 12 shows the edit screen 105 after the movement operation.

FIG. 12 shows a state when the single-sided→double-sided setting icon 110F is moved to the right of the color setting icon 110D. The inter-icon distance LA3 between the single-sided→double-sided setting icon 110F and the color setting icon 110D in FIG. 12 is set to the distance L2. As shown in FIG. 11, in the movement instruction based on the user operation, the inter-icon distance LA3 between the single-sided→double-sided setting icon 110F and the color setting icon 110D is wider than the distance L2. The horizontal length of the single-sided→double-sided setting icon 110F in FIG. 12 is longer than the horizontal length of the single-sided→double-sided setting icon 110F in FIG. 11. The display control unit 51 narrows the inter-icon distance LA3 to the distance L2 by enlarging the horizontal length of the single-sided→double-sided setting icon 110F. FIG. 12 shows a case where the length of the single-sided→double-sided setting icon 110F in the left-right direction is changed based on the inter-icon distance LA3 between the single-sided→double-sided setting icon 110F for which the movement instruction has accepted and the color setting icon 110D adjacent thereto in the left-right direction.

When the inter-icon distance between the adjacent icons at the movement position designated by the movement instruction is wider than the predetermined distance L2, the display control unit 51 narrows the inter-icon distance LA3 to the distance L2. When an inter-icon distance is larger than a predetermined second distance, a display control section enlarges the length of the first icon in a predetermined direction, and sets the inter-icon distance to be equal to or less than a second distance. By narrowing the inter-icon distance LA3, the display control unit 51 can effectively utilize the gap between the single-sided→double-sided setting icon 110F and the color setting icon 110D. The area between the single-sided→double-sided setting icon 110F and the color setting icon 110D can be utilized. The user is less likely to touch an area between the single-sided-→double-sided setting icon 110F and the color setting icon 110D where there is no icon 110.

FIG. 12 shows a case where the inter-icon distance LA3 between the single-sided→double-sided setting icon 110F and the color setting icon 110D is set to the distance L2, but the present disclosure is not limited thereto. By making the inter-icon distance LA3 narrower than that of L2, the display control unit 51 can effectively utilize the area between the single-sided→double-sided setting icon 110F and the color setting icon 110D.

In FIG. 12, the position of the right side of the single-sided→double-sided setting icon 110F is fixed, and the position of the left side thereof is changed to change the horizontal length of the single-sided→double-sided setting icon 110F, but the present disclosure is not limited thereto. The center position of the single-sided→double-sided setting icon 110F may be fixed, and the positions of the left side and the right side may be changed to change the horizontal length of the single-sided→double-sided setting icon 110F.

Figure 13:
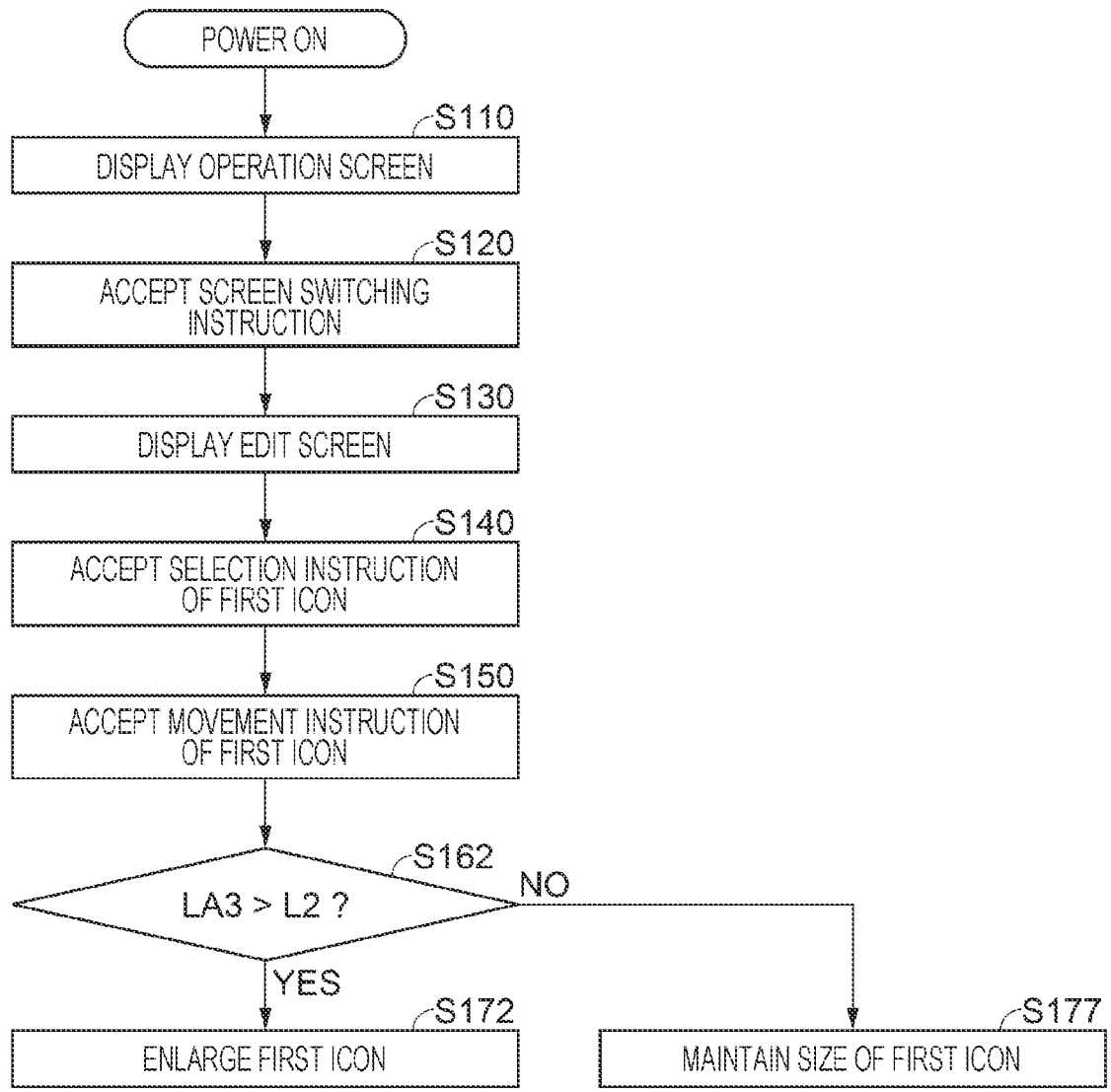
FIG. 13 is a diagram showing a flowchart at the time of the movement operation.

FIG. 13 shows a flowchart at the time of the movement operation.

A control method of the multifunction device 1 according to FIG. 13 is performed by the processor 27 of the display control unit 51 reading the display control program 45 from the memory 40 and executing the display control program 45.

The operations from step S110 to step S150 are the same as those of the first embodiment, and the details will be omitted.

When the single-sided→double-sided setting icon 110F accepts an instruction to move from the first position to the second position, in step S162, the display control unit 51 determines whether or not the inter-icon distance LA3 between the icons 110 adjacent to each other in the left-right direction and the icon 110 moving to the second position is wider than the distance L2. In the case of FIG. 11, it is determined whether or not the inter-icon distance LA3 between the single-sided→double-sided setting icon 110F and the color setting icon 110D is wider than the predetermined distance L2.

When the inter-icon distance LA3 is wider than the distance L2, the process proceeds to step S172. When the inter-icon distance LA3 is narrower than the distance L2, the process proceeds to step S177. In the case of FIG. 11, the inter-icon distance LA3 between the single-sided→double-sided setting icon 110F and the color setting icon 110D is wider than the predetermined distance L2. In the case of FIG. 11, the process proceeds to step S172.

In step S172, the display control unit 51 enlarges the horizontal length of the moving icon 110. The display control unit 51 sets the inter-icon distance LA3 between the moving icon 110 and the icons 110 adjacent to each other at the second position to be the distance L2 or less. In the case of FIG. 11, the display control unit 51 lengthens the horizontal length of the single-sided→double-sided setting icon 110F, and sets the inter-icon distance LA3 between the single-sided→double-sided setting icon 110F and the color setting icon 110D to the distance L2. By narrowing the inter-icon distance LA3 between the single-sided→double-sided setting icon 110F and the color setting icon 110D, the display control unit 51 can effectively utilize the area between the single-sided→double-sided setting icon 110F and the color setting icon 110D.

In step S177, the display control unit 51 moves the icon 110 for which the movement instruction has accepted to the second position. The horizontal length of the icon 110 that moves to the second position is maintained and does not change.

Fourth Embodiment

When the distance L1 set in the first embodiment is equal to or less than the distance L2 set in a third embodiment, the display control unit 51 controls the combination of the first embodiment and the third embodiment.

When the inter-icon distance LA1 between the moving icon 110 and the icons adjacent to each other at the second position is shorter than the distance L1, the display control unit 51 reduces the horizontal length of the moving icon 110 so that the inter-icon distance LA1 between the two icons 110 is the distance L1 or more and the distance L2 or less. When the display control unit 51 controls the inter-icon distance LA1 between the two adjacent icons 110, the visibility of the icons 110 can be improved and the area between the two icons can be effectively utilized.

When the inter-icon distance LA3 between the moving icon 110 and the icons adjacent to each other at the second position is wider than the distance L2, the display control unit 51 enlarges the horizontal length of the moving icon 110 so that the inter-icon distance LA3 between the two icons 110 is the distance L2 or less and the distance L1 or more. When the display control unit 51 controls the inter-icon distance LA1 between the two adjacent icons 110, the visibility of the icons 110 can be improved and the area between the two icons can be effectively utilized.

Fifth Embodiment

Figure 14:
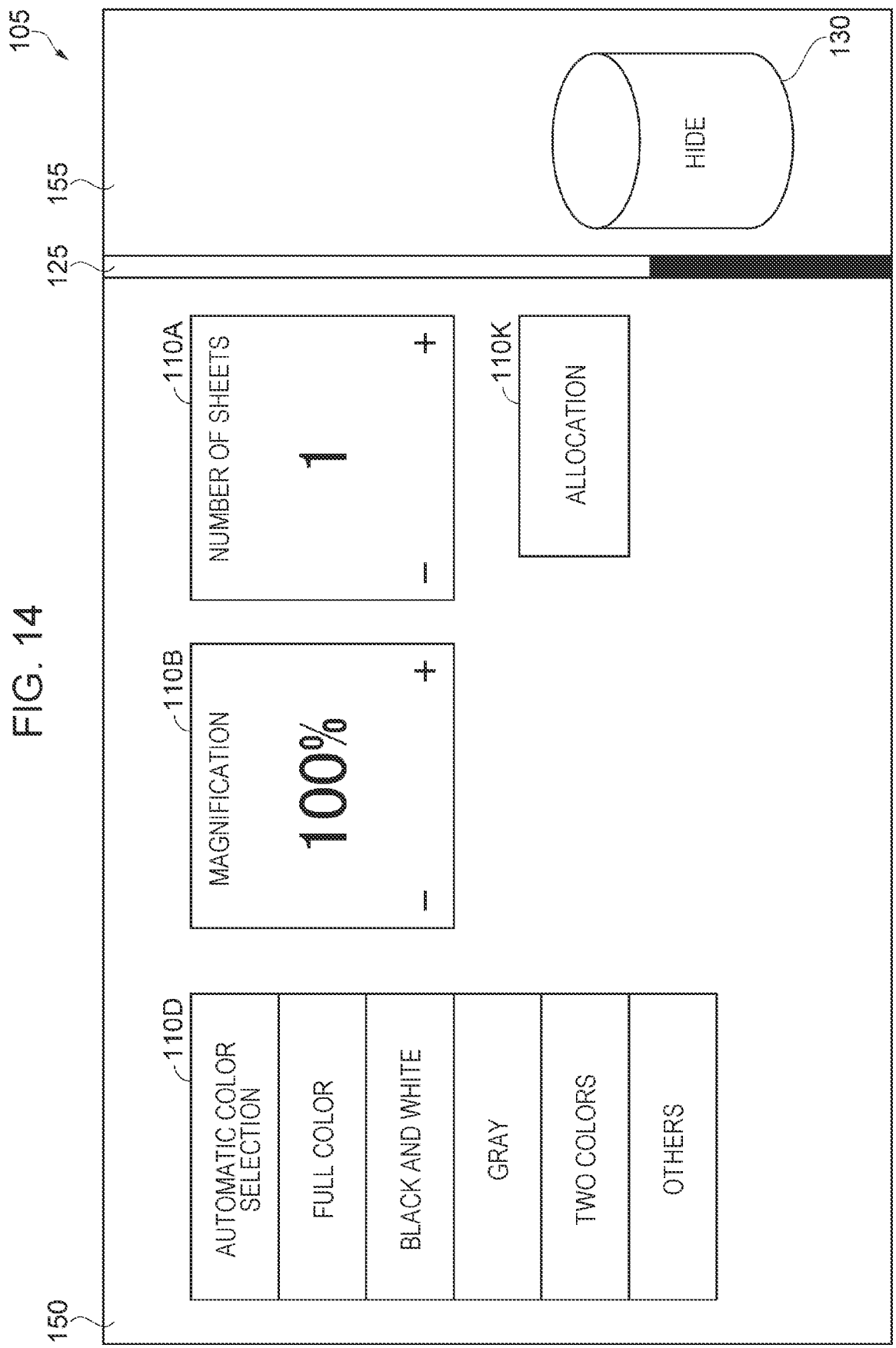
FIG. 14 is a diagram showing the edit screen displayed on the operation panel.

FIG. 14 shows an edit screen 105 displayed on the operation panel 30 according to a fifth embodiment. The layout of the plurality of icons 110 displayed on the edit screen 105 of FIG. 14 is different from the layout of the plurality of icons 110 displayed on the edit screen 105 of FIGS. 5 and 9.

The edit screen 105 of FIG. 14 displays the number-of-sheets designation icon 110A, the magnification designation icon 110B, the color setting icon 110D, and the allocation setting icon 110K in the variable area 150. The edit screen 105 of FIG. 14 displays the hide setting icon 130 in the fixed area 155.

Figure 15:
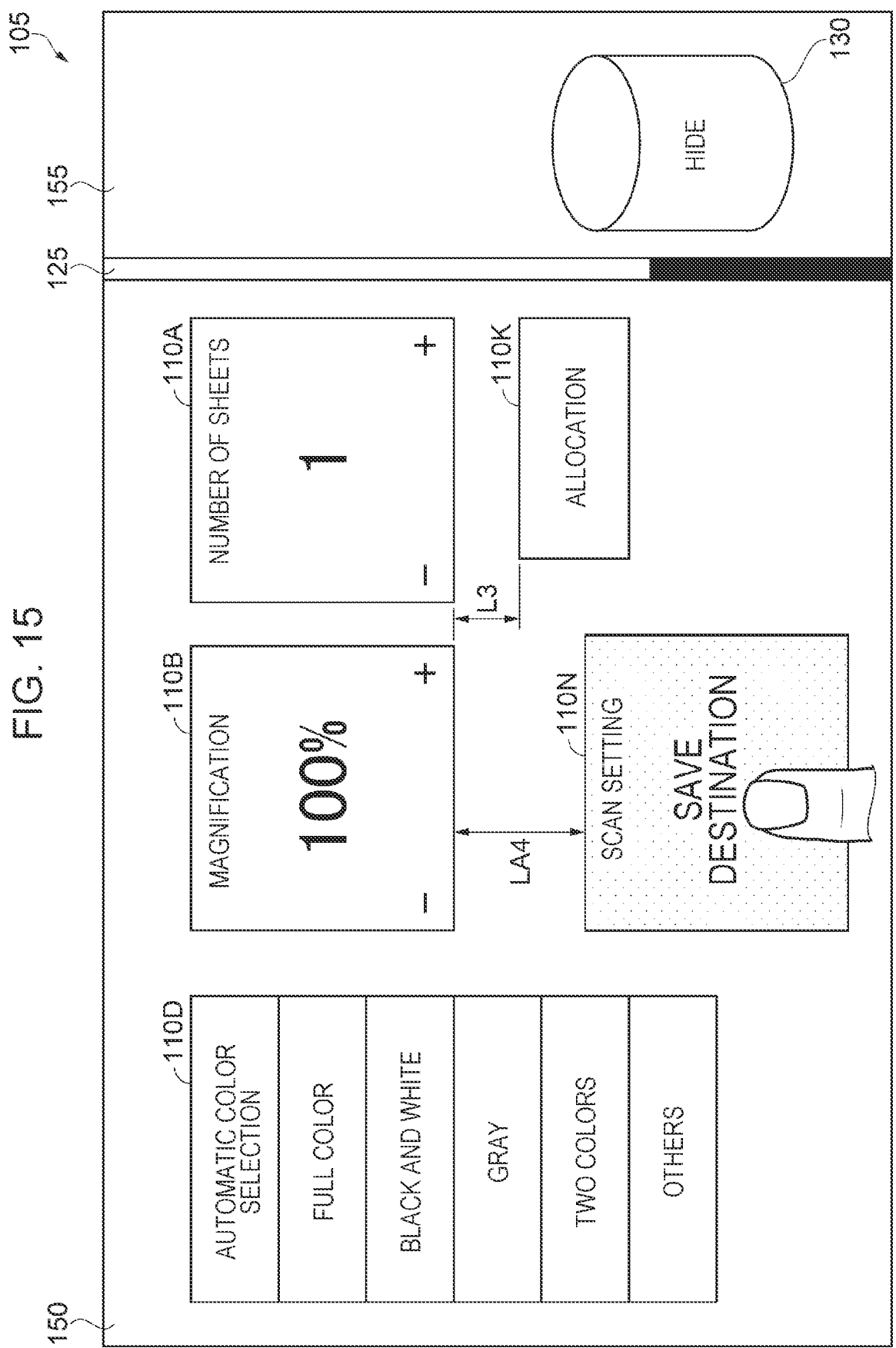
FIG. 15 is a diagram showing the edit screen at the time of a movement operation.

FIG. 15 shows the edit screen 105 at the time of a movement operation.

FIG. 15 shows a state in which a movement instruction is accepted based on a user's touch operation. The movement instruction in FIG. 15 is an instruction to move the save destination setting icon 110N under the magnification designation icon 110B. The movement instruction in FIG. 15 is an instruction to set an inter-icon distance LA4 between the save destination setting icon 110N and the magnification designation icon 110B. The inter-icon distance LA4 corresponds to an example of a second inter-icon distance. The inter-icon distance LA4 is a distance along the second axis. The vertical direction along the second axis is an example of a second direction orthogonal to a predetermined direction. The save destination setting icon 110N corresponds to an example of a first icon. The magnification designation icon 110B corresponds to an example of a third icon.

When the operation screen 100 is switched to the edit screen 105, the operation screen 100 of FIG. 4 is switched to the edit screen 105 (not shown). The position of each icon 110 included in the edit screen 105 based on the operation screen 100 of FIG. 4 is the same as the position of each icon 110 included in the operation screen 100 of FIG. 4, except for the start instruction icon 120. The start instruction icon 120 is not displayed on the edit screen 105. The position of the save destination setting icon 110N shown in FIG. 4 corresponds to a first position.

A distance L3 shown in FIG. 15 is a distance along the second axis, is predetermined, and is stored in the memory 40. The distance L3 corresponds to an example of a third distance. The save destination setting icon 110N in FIG. 15 indicates that the movement instruction to the position of the inter-icon distance LA4 wider than the distance L3 is accepted. The position of the save destination setting icon 110N shown in FIG. 15 corresponds to a second position.

Figure 16:
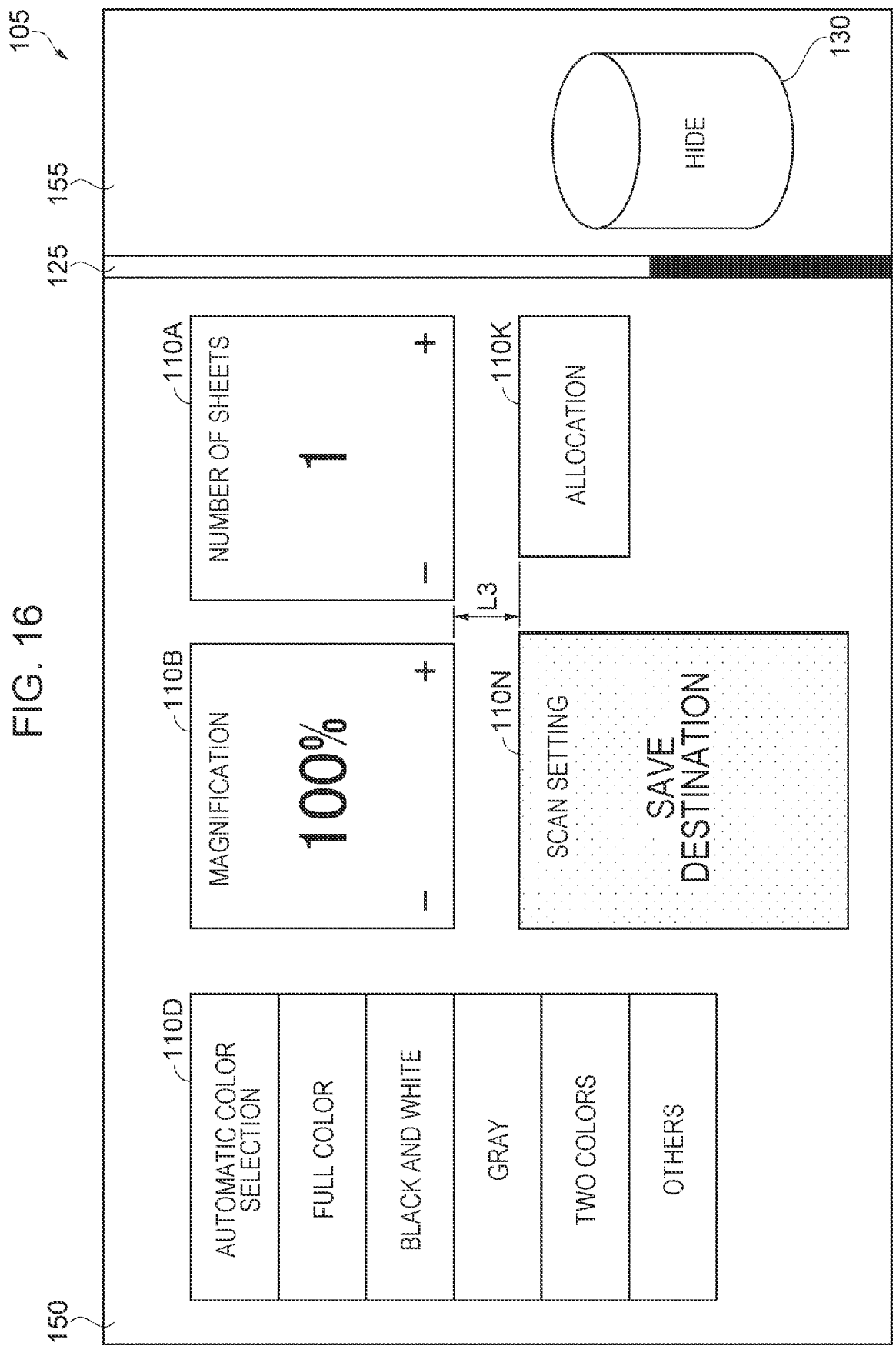
FIG. 16 is a diagram showing the edit screen after the movement operation.

FIG. 16 shows the edit screen 105 after the movement operation.

FIG. 16 shows a state when the save destination setting icon 110N is moved under the magnification designation icon 110B. The inter-icon distance LA4 between the save destination setting icon 110N and the magnification designation icon 110B in FIG. 16 is set to the distance L3. As shown in FIG. 15, in the movement instruction based on the user operation, the inter-icon distance LA4 between the save destination setting icon 110N and the magnification designation icon 110B is wider than the distance L3. The vertical length of the save destination setting icon 110N in FIG. 16 is longer than the vertical length of the save destination setting icon 110N in FIG. 15. The display control unit 51 narrows the inter-icon distance LA4 to the distance L3 by enlarging and lengthening the vertical length of the save destination setting icon 110N. FIG. 16 shows a case where the length of the save destination setting icon 110N in the vertical direction is changed based on the inter-icon distance LA4 between the save destination setting icon 110N for which the movement instruction has accepted and the magnification designation icon 110B adjacent thereto in the vertical direction.

When the inter-icon distance LA4 between the adjacent icons at the movement position designated by the movement instruction is wider than the predetermined distance L3, the display control unit 51 narrows the inter-icon distance LA4 to the distance L3. When a second inter-icon distance, which is the inter-icon distance LA4, is larger than a predetermined third distance, a display control section enlarges a second length of the first icon in a second direction, and sets the second inter-icon distance to be equal to or less than a third distance. By shortening the inter-icon distance LA4, the display control unit 51 can effectively utilize the space between the save destination setting icon 110N and the magnification designation icon 110B.

FIG. 16 shows a case where the inter-icon distance LA4 between the save destination setting icon 110N and the magnification designation icon 110B is set to the distance L3, but the present disclosure is not limited thereto. By setting the inter-icon distance LA4 to the distance L3 or less, the display control unit 51 can effectively utilize the space between the save destination setting icon 110N and the magnification designation icon 110B.

Figure 17:
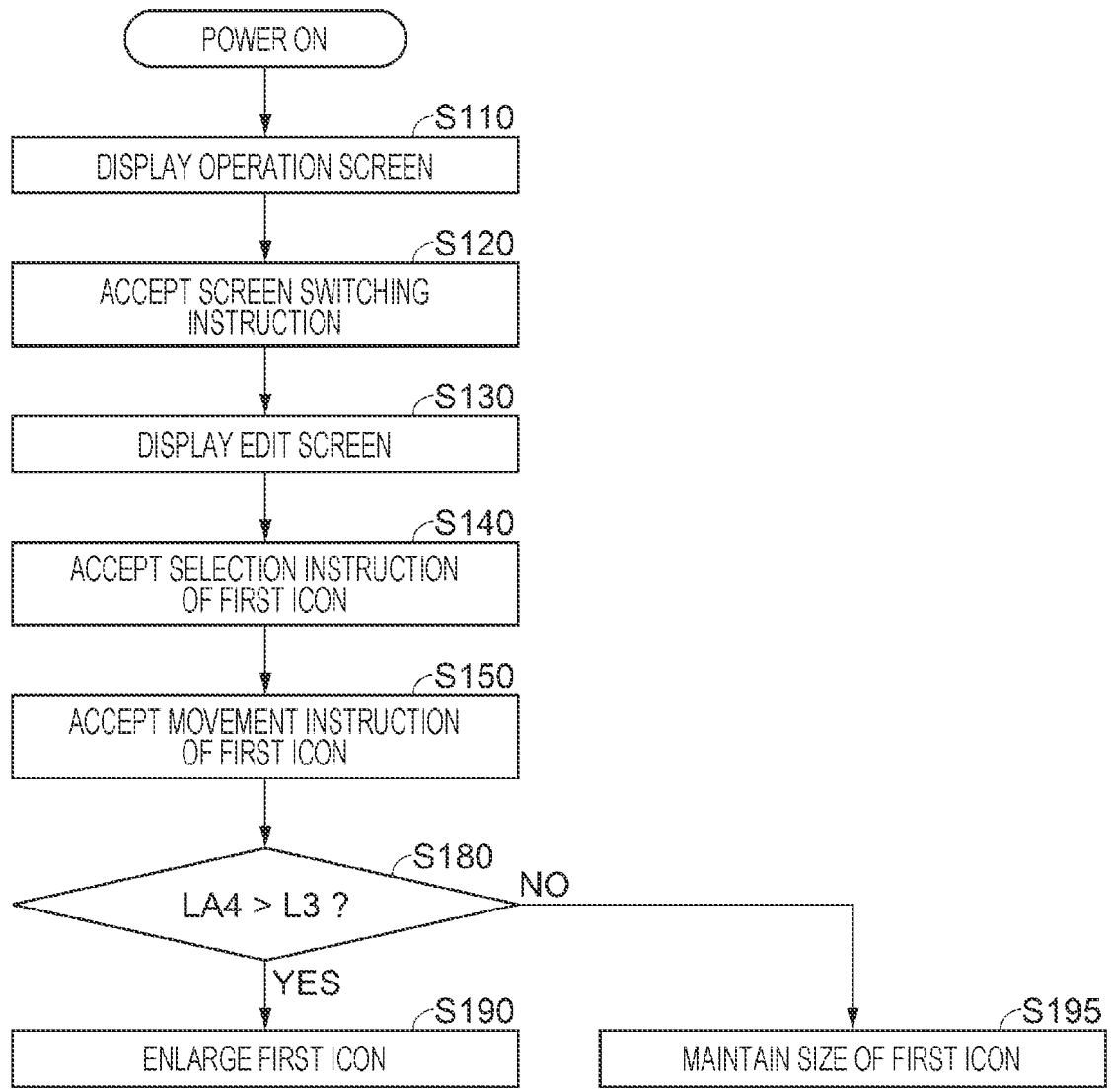
FIG. 17 is a diagram showing a flowchart at the time of the movement operation.

FIG. 17 shows a flowchart at the time of the movement operation.

A control method of the multifunction device 1 according to FIG. 17 is performed by the processor 27 of the display control unit 51 reading the display control program 45 from the memory 40 and executing the display control program 45.

The operations from step S110 to step S150 are the same as those of the first embodiment, and the details will be omitted.

When the moving icon 110 accepts an instruction to move from the first position to the second position, in step S180, the display control unit 51 determines whether or not the inter-icon distance LA4 between the icons 110 adjacent to each other in the vertical direction and the icon 110 moving to the second position is wider than the distance L3. In the case of FIG. 15, it is determined whether or not the inter-icon distance LA4 between the save destination setting icon 110N and the magnification designation icon 110B is wider than the predetermined distance L3.

When the inter-icon distance LA4 is wider than the distance L3, the process proceeds to step S190. When the inter-icon distance LA4 is narrower than the distance L3, the process proceeds to step S195. In the case of FIG. 15, the inter-icon distance LA4 between the save destination setting icon 110N and the magnification designation icon 110B is wider than the predetermined distance L3. In the case of FIG. 15, the process proceeds to step S190.

In step S190, the display control unit 51 enlarges the Vertical length of the moving icon 110. The display control unit 51 sets the inter-icon distance LA4 between the moving icon 110 and the icons 110 adjacent to each other at the second position to be the distance L3 or less. In the case of FIG. 15, the display control unit 51 lengthens the vertical length of the save destination setting icon 110N, and sets the inter-icon distance LA4 between the save destination setting icon 110N and the magnification designation icon 110B to the distance L3. By narrowing the inter-icon distance LA4 between the save destination setting icon 110N and the magnification designation icon 110B, the display control unit 51 can effectively utilize the area between the save destination setting icon 110N and the magnification designation icon 110B.

In step S195, the display control unit 51 moves the icon 110 for which the movement instruction has accepted to the second position. The vertical length of the icon 110 that moves to the second position is maintained and does not change.

Sixth Embodiment

Figure 18:
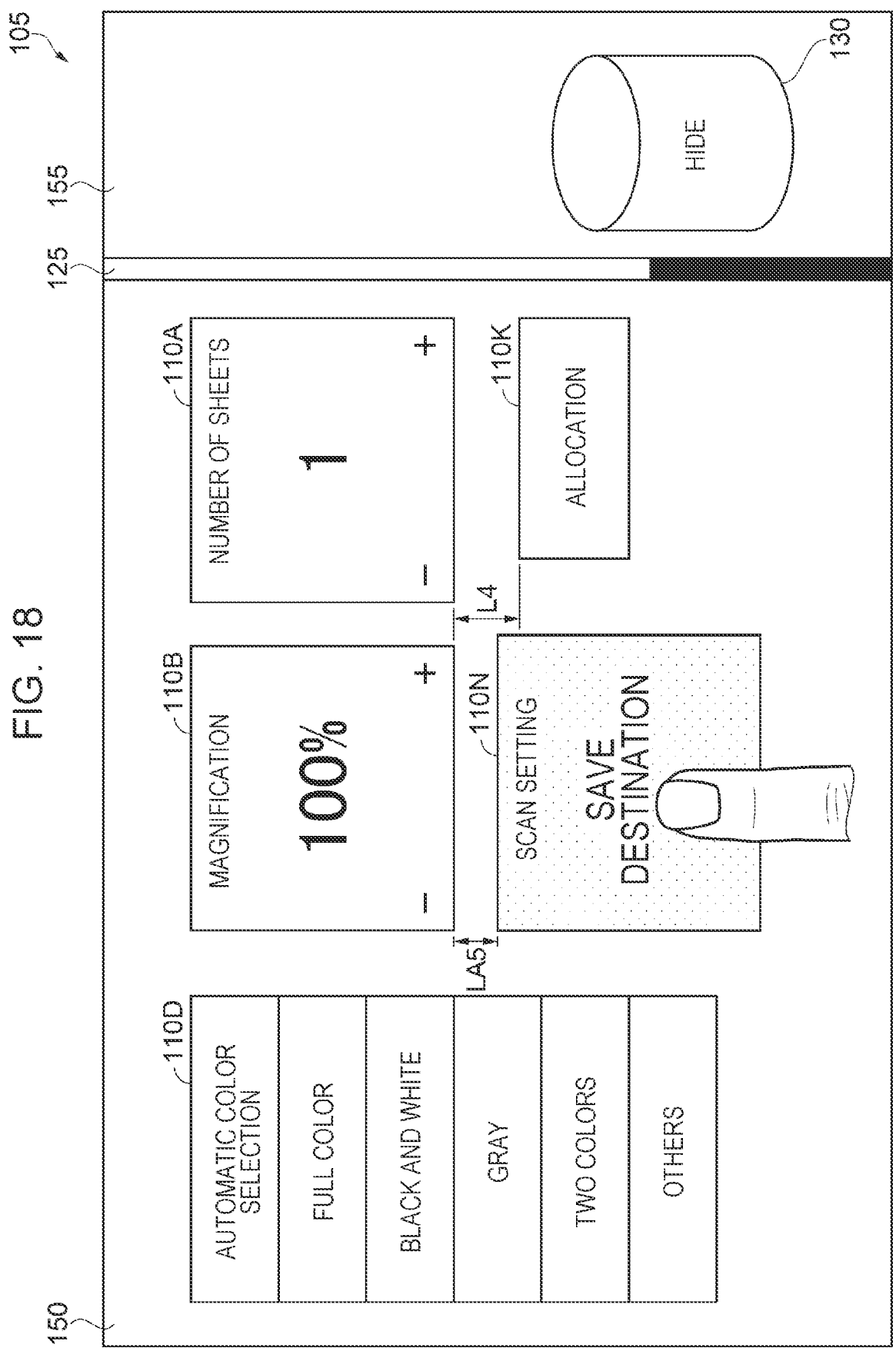
FIG. 18 is a diagram showing the edit screen at the time of a movement operation.

FIG. 18 shows the edit screen 105 at the time of a movement operation.

FIG. 18 shows a state in which the save destination setting icon 110N accepts a movement instruction based on a user's touch operation. The movement instruction in FIG. 18 is an instruction to move the save destination setting icon 110N under the magnification designation icon 110B. The movement instruction in FIG. 18 is an instruction to set an inter-icon distance LA5 between the save destination setting icon 110N and the magnification designation icon 110B. The inter-icon distance LA5 is a distance along the second axis. The vertical direction along the second axis is an example of a second direction orthogonal to a predetermined direction. The save destination setting icon 110N corresponds to an example of a first icon. The magnification designation icon 110B corresponds to an example of a third icon.

When the operation screen 100 is switched to the edit screen 105, the operation screen 100 of FIG. 4 is switched to the edit screen 105 (not shown). The position of each icon 110 included in the edit screen 105 based on the operation screen 100 of FIG. 4 is the same as the position of each icon 110 included in the operation screen 100 of FIG. 4, except for the start instruction icon 120. The start instruction icon 120 is not displayed on the edit screen 105. The position of the save destination setting icon 110N shown in FIG. 4 corresponds to a first position.

A distance L4 shown in FIG. 18 is a distance along the second axis, is predetermined, and is stored in the memory 40. The distance L4 corresponds to an example of a fourth distance. The save destination setting icon 110N in FIG. 18 indicates that the movement instruction to the position of the inter-icon distance LA5 shorter than the distance L4 is accepted. The position of the save destination setting icon 110N shown in FIG. 18 corresponds to a second position.

Figure 19:
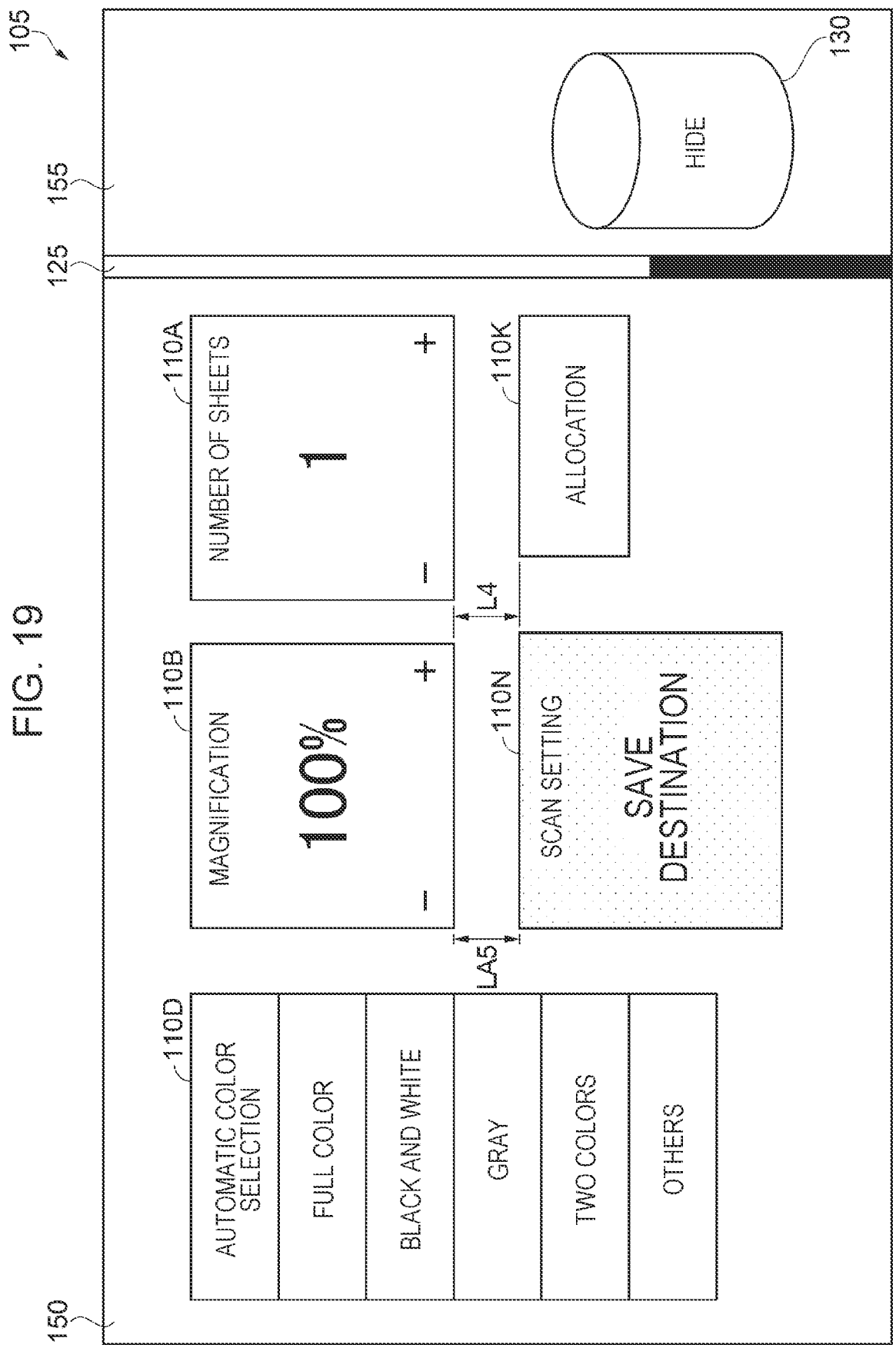
FIG. 19 is a diagram showing the edit screen after the movement operation.

FIG. 19 shows the edit screen 105 after the movement operation.

FIG. 19 shows a state when the save destination setting icon 110N is moved under the magnification designation icon 110B. The inter-icon distance LA5 between the save destination setting icon 110N and the magnification designation icon 110B in FIG. 19 is set to the distance L4. As shown in FIG. 18, in the movement instruction based on the user operation, the inter-icon distance LA5 between the save destination setting icon 110N and the magnification designation icon 110B is shorter than the distance L4. The vertical length of the save destination setting icon 110N in FIG. 19 is the same as the vertical length of the save destination setting icon 110N in FIG. 18. The display control unit 51 expands the inter-icon distance LA5 to the distance L4 by moving the save destination setting icon 110N downward. FIG. 19 shows a case where the position of the save destination setting icon 110N is changed based on the inter-icon distance LA5 between the save destination setting icon 110N for which the movement instruction has accepted and the magnification designation icon 110B adjacent thereto in the vertical direction. In the edit screen 105 of FIG. 19, since the save destination setting icon 110N is arranged in the variable area 150, there is a margin in the area where the icon 110 can be arranged in the vertical direction. The moving icon 110 is in a situation where it can be moved downward.

When the inter-icon distance LA5 between the adjacent icons 110 at the movement position designated by the movement instruction is shorter than the predetermined distance L4, the display control unit 51 expands the inter-icon distance LA5 to the distance L4. By expanding the inter-icon distance LA5, the user can easily distinguish between the save destination setting icon 110N and the magnification designation icon 110B. The visibility of the save destination setting icon 110N and the magnification designation icon 110B is improved. The user is less likely to mistakenly operate the save destination setting icon 110N and the magnification designation icon 110B.

FIG. 19 shows a case where the inter-icon distance LA5 between the save destination setting icon 110N and the magnification designation icon 110B is set to the distance L4, but the present disclosure is not limited thereto. By widening the inter-icon distance LA5 to the distance L4 or more by the display control unit 51, the user can more easily distinguish between the save destination setting icon 110N and the magnification designation icon 110B.

Figure 20:
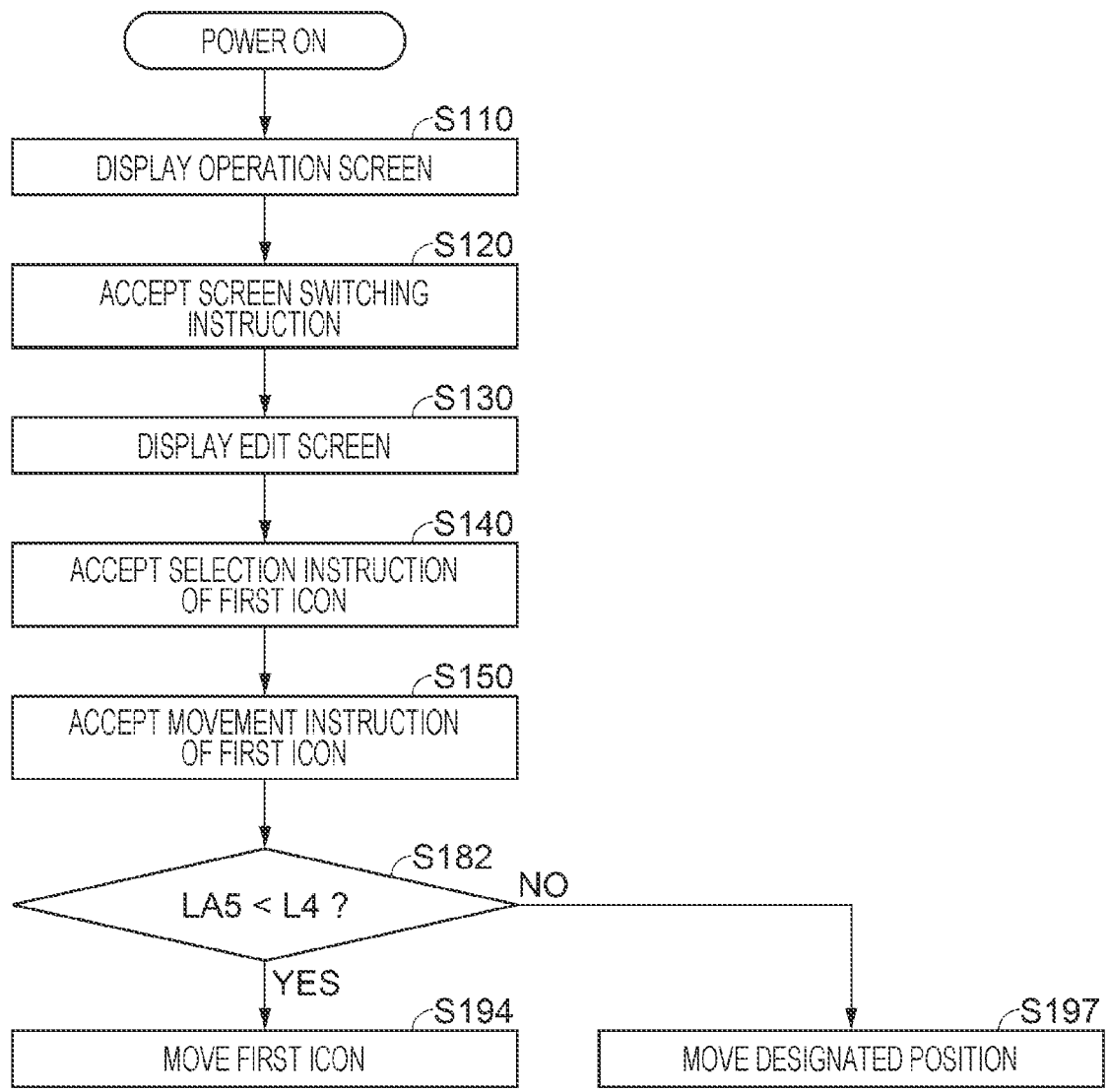
FIG. 20 is a diagram showing a flowchart at the time of the movement operation.

FIG. 20 shows a flowchart at the time of the movement operation.

A control method of the multifunction device 1 according to FIG. 20 is performed by the processor 27 of the display control unit 51 reading the display control program 45 from the memory 40 and executing the display control program 45.

The operations from step S110 to step S150 are the same as those of the first embodiment, and the details will be omitted.

When the save destination setting icon 110N accepts an instruction to move from the first position to the second position, in step S182, the display control unit 51 determines whether or not the inter-icon distance LA5 between the icons 110 adjacent to each other in the vertical direction and the icon 110 moving to the second position is shorter than the distance L4. In the case of FIG. 18, it is determined whether or not the inter-icon distance LA5 between the save destination setting icon 110N and the magnification designation icon 110B is shorter than the predetermined distance L4.

When the inter-icon distance LA5 is shorter than the distance L4, the process proceeds to step S194. When the moving icon 110 overlaps another icon 110 at the second position, it is determined that the inter-icon distance LA5 is shorter than the distance L4, and the process proceeds to step S194. When the inter-icon distance LA5 is wider than the distance L4, the process proceeds to step S197. When there is no icon 110 that is adjacent to the moving icon 110 in the vertical direction at the second position, the process proceeds to step S197. In the case of FIG. 18, the inter-icon distance LA5 between the save destination setting icon 110N and the magnification designation icon 110B is shorter than the predetermined distance L4. In the case of FIG. 18, the process proceeds to step S194.

In step S194, the display control unit 51 changes the position of the moving icon 110. The display control unit 51 sets the inter-icon distance LA5 between the moving icon 110 and the icons 110 adjacent to each other at the second position to be the distance L4 or more. By expanding the inter-icon distance LA5 between the save destination setting icon 110N and the magnification designation icon 110B, the user can easily distinguish between the save destination setting icon 110N and the magnification designation icon 110B, and the visibility is improved.

In step S197, the display control unit 51 moves the icon 110 for which the movement instruction has accepted to the second position.

In the above embodiment, the case where the control regarding the distance in the left-right direction is performed and the case where the control regarding the distance in the vertical direction is performed are shown separately, but the present disclosure is not limited thereto. The control regarding the distance in the left-right direction and the control regarding the distance in the vertical direction may be performed in combination. As an example, the control of the first embodiment and the control of the fifth embodiment may be performed in combination. Other combinations can be carried out as appropriate.

According to the above-described embodiments, the display control unit 51 changes the length of the first icon in a predetermined direction based on the inter-icon distances LA1, LA2, and LA3 between the moved first icon and the second icon adjacent to the first icon in the predetermined direction.

When the first icon moves from the first position to the second position in accordance with the instruction of the user, the display control unit 51 changes the length of the first icon in a predetermined direction according to the distance between the first icon and the second icon adjacent thereto in the predetermined direction at the second position. By changing the length of the first icon in the predetermined direction, the multifunction device 1 can suppress the deterioration of the visibility and operability of each icon for the user.

As shown in the fifth embodiment and the sixth embodiment, when the first icon moves from the first position to the second position, the display control unit 51 changes the length of the first icon in a second direction according to the distance between the first icon and a third icon adjacent thereto in the second direction at the second position. By changing the length of the first icon in the second direction, the multifunction device 1 can suppress the deterioration of the visibility and operability of each icon for the user.

In the above embodiment, when the first icon moves from the first position to the second position, the multifunction device 1 changes the length of the first icon in a predetermined direction according to the distance between the first icon and the second icon adjacent thereto in the predetermined direction at the second position. By changing the length of the first icon in the predetermined direction, the multifunction device 1 can suppress the deterioration of the visibility and operability of each icon for the user.

In the above embodiment, when the first icon moves from the first position to the second position, the display control program 45 changes the length of the first icon in a predetermined direction according to the distance between the first icon and the second icon adjacent thereto in the predetermined direction at the second position. By changing the length of the first icon in the predetermined direction, the display control program 45 can suppress the deterioration of the visibility and operability of each icon for the user.

In addition, it is sufficient that the size of the first icon after movement is changed according to the distance to the adjacent object. The direction for changing the size of the first icon may be a direction for changing the length in any direction, such as a direction in which the icon is not present. In addition to the icon, it is conceivable that the object is an edge of the screen or an edge of the partitioned area. For example, when the icon is not present between the edge of the edit screen 105 and the first icon after movement, the size of the first icon may be extended to the vicinity of the edge of the edit screen 105 according to the distance between the object called the edge of the edit screen 105 and the first icon after movement.

The function of the display control unit 51 may be realized by one or more processors or a semiconductor chip. For example, the display control unit 51 may be configured to further include a sub-processing device (co-processor) such as a system-on-a-chip (SoC), a micro control unit (MCU), and a field-programmable gate array (FPGA). The display control unit 51 may cooperate with both the CPU and the sub-processing device, or may selectively use one of the two to perform various controls.

The processing units of the flowcharts of FIGS. 8, 13, 17, and 20 are divided according to the main processing contents in order to make the processing of the multifunction device 1 easy to understand, and is not limited by the method and name of division of the processing unit. The processing of each step may be divided into more processing units depending on the processing content. One processing unit may be divided to include more processing. The order of processing may be appropriately changed as long as it does not interfere with the purpose.

Although the display control method according to the present embodiment shows a case where the processor 27 included in the multifunction device 1 is realized by executing the display control program 45, the display control program 45 executed by the processor 27 in order to realize the display control method can be configured in the form of a recording medium recorded in a computer-readable manner or a transmission medium for transmitting the display control program 45. As the recording medium, a magnetic or optical recording medium or a semiconductor memory device can be used. Examples of the recording medium include a portable or fixed recording medium such as a flexible disk, HDD, a compact disk read only memory (CD-ROM), a digital versatile disk (DVD), a Blu-ray (registered trademark) disc, a magneto-optical disk, a flash memory, and a card type recording medium. The recording medium may be a non-volatile storage device such as a RAM, a ROM, or an HDD included in the multifunction device 1.

What is claimed is:
1. A multifunction device comprising:
a reading unit that reads a document;
a printing unit that performs printing on a medium;
an operation panel that accepts an execution instruction and an edit instruction from a user and displays an operation screen including a plurality of icons and an edit screen including the plurality of icons; and a display control section that switches display of the operation panel between the operation screen and the edit screen, wherein the operation panel accepts the execution instruction to execute the reading unit or the printing unit when the operation screen is displayed, and accepts the edit instruction including a movement instruction which is an instruction to move the icon when the edit screen is displayed, and the display control section moves a designated first icon among the plurality of icons to a second position when the operation panel accepts the movement instruction to move the first icon from a first position to the second position on the edit screen, and changes a size of the first icon with movement based on an inter-icon distance between the first icon after the movement and a second icon adjacent to the first icon after the movement.

2. The multifunction device according to claim 1, wherein when the inter-icon distance is smaller than a predetermined first distance, the display control section reduces the first icon and sets the inter-icon distance to be equal to or greater than the first distance.

3. The multifunction device according to claim 2, wherein when the inter-icon distance is smaller than a predetermined threshold value, the display control section prohibits the movement of the first icon to the second position.

4. The multifunction device according to claim 1, wherein when the inter-icon distance is larger than a predetermined second distance, the display control section enlarges the length of the first icon in the predetermined direction and sets the inter-icon distance to be equal to or less than the second distance.

5. The multifunction device according to claim 1, wherein when the display control section moves the first icon to the second position, in a case in which there are the second icon adjacent to the first icon after the movement in a first direction and a third icon adjacent to the first icon in a second direction orthogonal to the first direction, the display control section changes a size of the first icon in the first direction with the movement based on the inter-icon distance, and also changes a size of the first icon in the second direction with the movement based on a second inter-icon distance between the first icon and the third icon.

6. The multifunction device according to claim 5, wherein when the second inter-icon distance is larger than a predetermined third distance, the display control section enlarges the second length of the first icon in the second direction and sets the second inter-icon distance to be equal to or less than the third distance.

7. The multifunction device according to claim 5, wherein when the second inter-icon distance is smaller than a predetermined fourth distance, the display control section moves the first icon in the second direction without changing the second length of the first icon and sets the second inter-icon distance to be equal to or greater than the fourth distance.

8. A display control method of a multifunction device including an operation panel that accepts an execution instruction and an edit instruction from a user and displays an operation screen including a plurality of icons and an edit screen including the plurality of icons, a reading unit that reads a document, and a printing unit that performs printing on a medium, the display control method comprising:

displaying the operation screen for accepting the execution instruction to execute the reading unit or the printing unit;

switching display of the operation panel from the operation screen to the edit screen for accepting the edit instruction including a movement instruction which is an instruction to move the icon;

moving a designated first icon among the plurality of icons to a second position when the movement instruction to move the first icon from a first position to the second position is accepted on the edit screen; and changing a size of the first icon with movement based on an inter-icon distance between the first icon after the movement and an object adjacent to the first icon after the movement.

9. A non-transitory computer-readable storage medium storing a display control program executed by a processor of a multifunction device including an operation panel that accepts an execution instruction and an edit instruction from a user and displays an operation screen including a plurality of icons and an edit screen including the plurality of icons, a reading unit that reads a document, and a printing unit that performs printing on a medium, the display control program causing the processor to execute:

displaying the operation screen for accepting the execution instruction to execute the reading unit or the printing unit;

switching display of the operation panel from the operation screen to the edit screen for accepting the edit instruction including a movement instruction which is an instruction to move the icon;

moving a designated first icon among the plurality of icons to a second position when the movement instruction to move the first icon from a first position to the second position is accepted on the edit screen; and changing a size of the first icon with movement based on an inter-icon distance between the first icon after the movement and an object adjacent to the first icon after the movement.

* * * * *